United States Patent [19]
Murakami et al.

[11] Patent Number: 5,408,332
[45] Date of Patent: Apr. 18, 1995

[54] FOCUSING APPARATUS FOR VIDEO CAMERA OR THE LIKE

[75] Inventors: Toshio Murakami, Yokohama; Takashi Azumi, Katsuta; Hiroshi Sakurai, Kamakura, all of Japan

[73] Assignees: Hitachi, Ltd.; Hitachi Video Engineering Incorporated, both of Tokyo, Japan

[21] Appl. No.: 305,701

[22] Filed: Feb. 3, 1989

[30] Foreign Application Priority Data

| Mar. 18, 1988 | [JP] | Japan | 63-63303 |
| Apr. 15, 1988 | [JP] | Japan | 63-91452 |
| Jun. 3, 1988 | [JP] | Japan | 63-135525 |

[51] Int. Cl.⁶ .............................................. H04N 5/38
[52] U.S. Cl. .................................... 348/345; 348/357; 354/195.1
[58] Field of Search .............. 358/227, 225, 209, 345, 358/357, 335; 354/195.1, 195.12, 400

[56] References Cited

U.S. PATENT DOCUMENTS

| 4,236,794 | 12/1980 | Gordon . | |
| 4,556,907 | 12/1985 | Urata et al. . | |
| 4,570,185 | 2/1986 | Arai et al. | 358/227 |
| 4,616,264 | 10/1986 | Pshtissky | 358/227 |
| 4,672,456 | 6/1987 | Murai et al. | 358/227 |
| 4,717,959 | 1/1988 | Isago | 358/227 |
| 4,730,201 | 3/1988 | Sasagaki . | |
| 4,740,076 | 4/1988 | Ueda et al. | 354/400 |
| 4,748,509 | 5/1988 | Otake et al. | 358/227 |
| 4,829,331 | 5/1989 | Aihara | 354/400 |

FOREIGN PATENT DOCUMENTS

| 2544728 | 1/1977 | Germany . | |
| 0177082 | 10/1983 | Japan . | |
| 0208733 | 12/1983 | Japan . | |
| 0193112 | 8/1986 | Japan | 358/227 |
| 0083711 | 4/1988 | Japan . | |
| 0153526 | 6/1988 | Japan | 358/227 |
| 1140566 | 1/1969 | United Kingdom . | |

OTHER PUBLICATIONS

IEEE International Conference on Consumer Electronics 1986, pp. 140–141.
"National Technical Report" vol. 31, No. 6 Dec. 1985, pp. 65–67.
"Hitachi's Camera Combined With VTR, Mastax Movie C30" Apr. 1987, p. 17.

Primary Examiner—James L. Dwyer
Assistant Examiner—M. Shehata
Attorney, Agent, or Firm—Antonelli, Terry, Stout & Kraus

[57] ABSTRACT

A focusing apparatus for a video camera or the like in which a change-over between automatic focusing and manual focusing is possible includes an endlessly rotatable and hand-worked manipulator, a detector for detecting the direction and amount of manipulation or rotational movement of the manipulator, and a controller/driver for moving a part of the optical elements in an optical system along its optical axis direction in a direction corresponding to the direction of manipulation of the manipulator detected by the detector and by a distance corresponding to the amount of manipulation of the manipulator detected by the detector, thereby taking the focus.

26 Claims, 16 Drawing Sheets

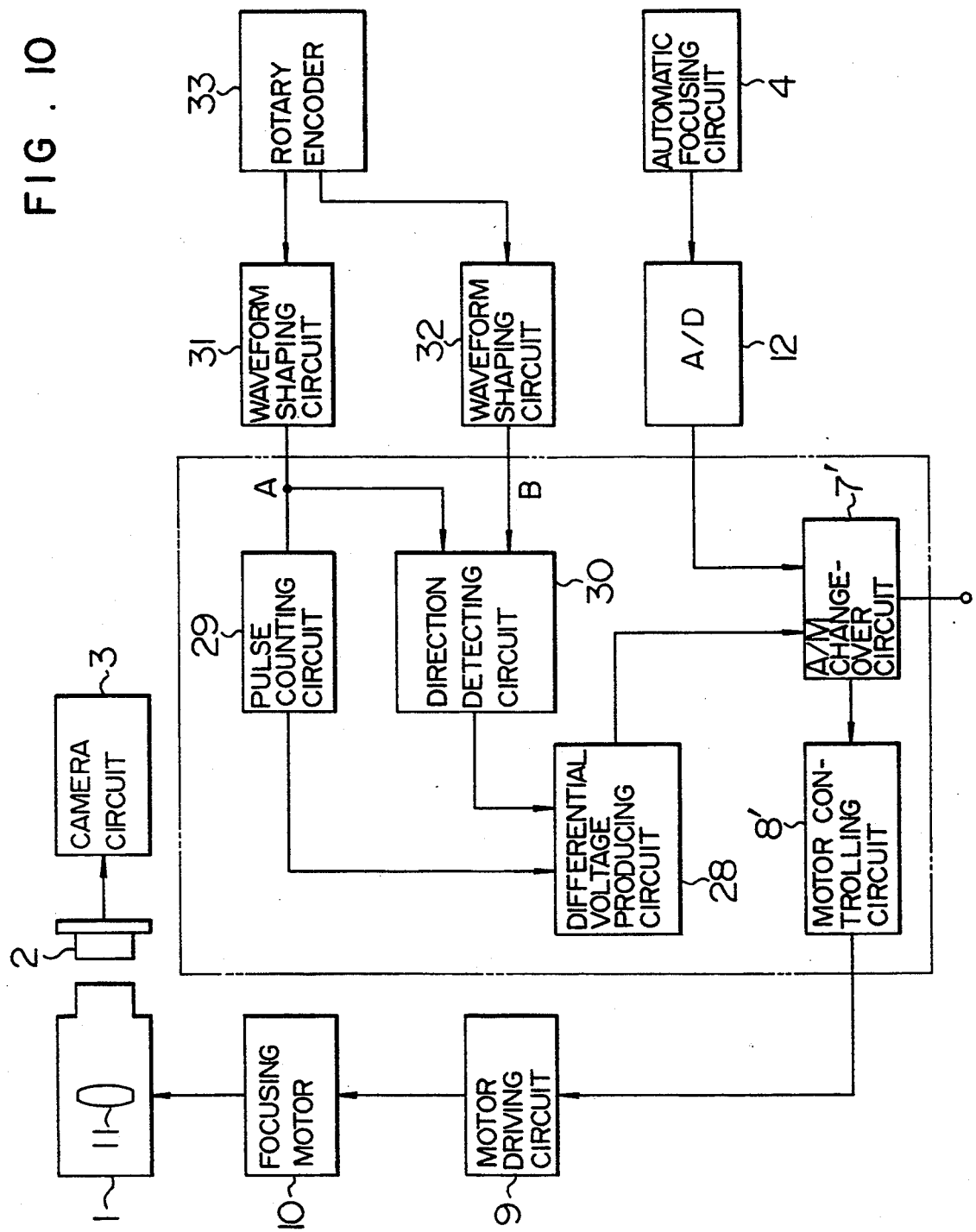

FOCUSING APPARATUS FOR VIDEO CAMERA OR THE LIKE

BACKGROUND OF THE INVENTION

The present invention relates to a focusing apparatus a for video camera or the like, and more particularly to a focusing apparatus suitable for the attainment of focusing through manual operation.

The basic structure of a lens system of a video camera or the like includes an object lens group 17, a variator lens group 18, a compensator lens group 19, a rear lens or master lens group 21, an image pickup element 22 and a diaphragm device 20, as shown by a schematic view of FIG. 1. The object lens,group 17 has a function of taking the focus of each desired object at any distance. The variator lens group 18 has a variable power or multiplying function associated with zooming. The compensator lens group 19 is movable interlocking with zooming to perform a compensation function of preventing the desired object from being taken out of focus during zooming. The master lens group 21 has an imaging function of forming an image of the object onto the image pickup element 22.

In a zoom lens used in such a video camera, focusing or the adjustment of focus is usually effected by the movement of the object lens group. A so-called automatic focusing apparatus in which the adjustment of focus is automatically made, is based on an infrared ranging system or TTL projection system, as described by National Technical Report, Vol. 31, No. 6, pp. 65-67, December 1985 (hereinafter referred to as prior art (A)). The prior art (A) includes no particular description of the case where focusing is performed through manual operation. However, the prior art (A) discloses a structure in which an automatic/manual change-over switch is usually provided to allow a change-over between automatic focusing and manual focusing, as required, more especially, in a structure in which a manual focus adjustment is made in such a manner that a focus ring 16 mounted on a lens tube or sleeve 100 and interlocking with the object lens 17 as shown in FIG. 2 is rotationally moved through directly hand-worked operation, thereby performing a fine focus adjustment.

In recent years, compact articles or goods which are workable (or easy to deal with), of low cost and handy to carry are greatly required with rapid demands for cameras combined with VTR's (such as movies). In order to cope with such requirements, there has been reported an article as disclosed by "Hitachi's Camera Combined with VTR; Mastax Movie C30" on page 17 of the "Hitachi" for April 1987 (hereinafter referred to as prior art (B)). In a structure disclosed by the prior art (B), the entire lens system is incorporated into a movie casing.

With the structure disclosed by the prior art (B), it is not possible to take the focus by the rotational movement of a focus ring for lens through directly hand-worked operation as is done by the prior art (A). Therefore, the prior art (B) employs a manual focusing mechanism called a power focusing mechanism, as is also suggested by the prior art (A), in order to satisfy the above-mentioned requirements for compact and workable articles. A concrete example of the power focusing mechanism is not disclosed by the prior art (A) but can be realized as shown in FIG. 3.

FIG. 3 shows a control circuit for a zoom lens generally used in a video camera. In the figure, reference symbols A and B designate terminals applied with control signals for automatic focusing, numeral 101 designates an automatic/manual change-over switch, and symbols $SW_1$ and $SW_2$ designate button switches for power focusing. In each of the switches $SW_1$ and $SW_2$, opposite contacts thereof are connected with each other during only a time when a button of that switch is depressed. Numeral 102 designates a focusing motor, and numeral 103 designates a motor driving circuit which includes transistors $Q_1$ to $Q_7$ and resistors $R_1$ to $R_6$. In a state in which the automatic/manual change-over switch 101 is turned to the manual side (or switch open side) and the button switch $SW_1$ is depressed, the transistors $Q_1$, $Q_2$, $Q_3$ and $Q_8$ are turned off while the transistors $Q_4$, $Q_5$, $Q_6$ and $Q_7$ are turned on so that a motor current flows in a direction indicated by arrow a along a path of power source ($V_{CC}$)→transistor $Q_4$→ motor 102→transistor $Q_7$→earth (G), thereby rotating the motor 102 (for example, in a positive or forward direction). On the other hand, in a state in which the button switch $SW_2$ is depressed, the transistors $Q_4$, $Q_5$, $Q_6$ and $Q_7$ are turned off while the transistors $Q_1$, $Q_2$, $Q_3$ and $Q_8$ are turned on so that a motor current flows in a direction indicated by arrow b along a path of power source ($V_{CC}$)→transistor $Q_8$ →motor 102→transistor $Q^3$→earth (G) , thereby rotating the motor 102 in a negative or reverse direction. In a state in which the button switches $SW_1$ and $SW_2$ are not depressed, the transistors $Q_1$, $Q_2$, $Q_3$, $Q_5$, $Q_6$ and $Q_7$ are turned on and the transistors $Q_4$ and $Q_8$ are turned off so that opposite ends of the motor 102 are grounded through the transistors $Q_3$ and $Q_7$ and hence no motor current flows, thereby keeping the motor 102 in a stopped condition.

The repetition of the forward rotation, reverse rotation and stoppage of the motor through the above-mentioned operation of the button switches allows focusing by fine adjustment, that is, power focusing.

The foregoing has been explained in conjunction with the case where focusing is effected by means of the object lens. Also, a so-called rear focusing system (master lens focusing system) is known in which focusing is effected by moving the master lens. In such a case, the coupling of the master lens with an inter-locking relation with the focus ring is difficult for structural reasons and hence a power focusing device is an indispensable mechanism.

In the structure disclosed by the prior art (A), since the focus ring for lens is rotated through directly hand-worked operation, focusing can be attained rapidly and with high precision. However, it is difficult for structural reasons to make the article compact and the structure is hard to deal with. On the other hand, the structure disclosed by the prior art (B) is excellent in compactness of the article. However, in the case of the so-called power focusing device by which focusing is made through control for motor or lens movement/-stoppage by the operation of button switches, the operation itself is conveniently simplified but a delicate button operation is required for taking the focus with high or excellent precision. Also, due to the influence of inertia of the lens and/or motor, etc., it is difficult to accurately stop the lens at a desired position. Further, when the speed rotational movement of the motor or lens is lowered, for example, by decreasing the motor current, a time required for focus adjustment becomes inconveniently long though the requirement for delicate button operation can be moderated and the influence of inertia can be reduced. Furthermore, even if a rear focusing system is employed, focusing must be performed by use of the power focusing device and hence it is difficult like the prior art (B) to accurately stop the lens at a desired position.

U.S. application Ser. No. 233,011, filed on Jul. 18, 1988 by Murakami et al and entitled "Focusing Apparatus of Video Camera or the Like" has proposed an apparatus in which focusing to a position corresponding to the position of a contact or slider of a variable resistor manually operated is made by means of a feedback control system. If this apparatus in which the focus is taken depending on the position of the slider of the variable resistor is used in, for example, a system in which a change-over between automatic focusing and manual focusing is possible, the change-over from automatic focusing to manual focusing causes a difference between a position at which focusing has been attained through automatic operation and a focal position which corresponds to the present position of the slider of the variable resistor, so that the in-focus position of the camera is inconveniently feedback-controlled toward a focal position corresponding to the position of the slider.

SUMMARY OF THE INVENTION

An object of the present invention is to provide a focusing apparatus for a video camera or the like in which a focal position of an optical system is changed in accordance with the direction and amount of manipulation or movement of a manipulator such as a slider of a variable resistor.

Another object of the present invention is to provide a focusing apparatus for a video camera or the like in which upon change-over from automatic focusing to manual focusing, a focal position of an optical system is changed irrespective of the position of a manipulator such as a slider of a variable resistor but in accordance with the direction and amount of movement of the manipulator which has been manually moved after the change-over.

According to the present invention, the direction and amount of movement of a manipulator such as a slider of a variable resistor are detected and an optical element in an optical system is moved in a direction corresponding to the detected movement direction by a distance corresponding to the detected movement amount, thereby changing the focal position of the optical system.

A focusing apparatus for a video camera or the like in which a change-over between automatic focusing and manual focusing is possible, can be constructed such that upon change-over from automatic focusing to manual focusing, a focal position is manually changed by moving at least one optical element in an optical system irrespective of the stopped position of a manipulator for manual focusing but in accordance with the direction and amount of movement of the manipulator which has been manually moved after the change-over.

Especially, in the case where the manipulator is endlessly rotatable in either direction and a rotary variable resistor is used as means for detecting the direction and angle of rotation of the manipulator, an open area where the movement of a slider of the variable resistor as the manipulator is not detectable may be produced between opposite ends of a resistor element of the variable resistor which the slider contacts. According to certain embodiments of the present invention, the focal position of the optical system can be changed correctly even if the slider is present in the open area. Namely, a plurality of resistor elements are used so that sliders for two resistor elements are not simultaneously positioned into the open area or a variable resistor including one resistor element is provided with a plurality of sliders rotated simultaneously with a predetermined angle kept therebetween so that the sliders are not simultaneously positioned into the open area. In either case, the direction and amount of movement of either one slider is selectively detected and the focal position of the optical system is changed on the basis of the results of detection. A rotary encoder can be used in place of the rotary variable resistor.

According to the present invention, it is possible to detect a signal changing in accordance with the amount of manipulation of the manipulator. Values of this changing signal before and after a predetermined internal or period of time are compared with each other to produce a differential signal representative of a difference therebetween and a focusing motor is controlled in such a manner that the focusing motor is rotated in a positive or forward direction, for example, when the differential signal takes a plus (+) sign, the motor is rotated in a negative or reverse direction when the differential signal takes a minus (−) sign and the motor is stopped when the differential signal is zero while a focusing lens is moved by a distance corresponding to the absolute value of the differential signal. Thereby, it is possible to move the focusing lens in accordance with the amount of movement of the manual focus adjustment means or manipulator. As a result, a desired manual focus adjustment for any object can be realized.

If a focusing mechanism is employed for a rear or master lens having a light weight and the lens is driven by a pulse motor or the like having a small inertia and a high precision for positioning, a more accurate positioning control can be conveniently attained.

BRIEF DESCRIPTION OF THE DRAWINGS

FIG. 10 shows a block diagram in the case where a rotary encoder is used as a manipulator;

DESCRIPTION OF THE PREFERRED EMBODIMENTS

Embodiments of the present invention will now be explained in reference with the accompanying drawings.

Figure 4:
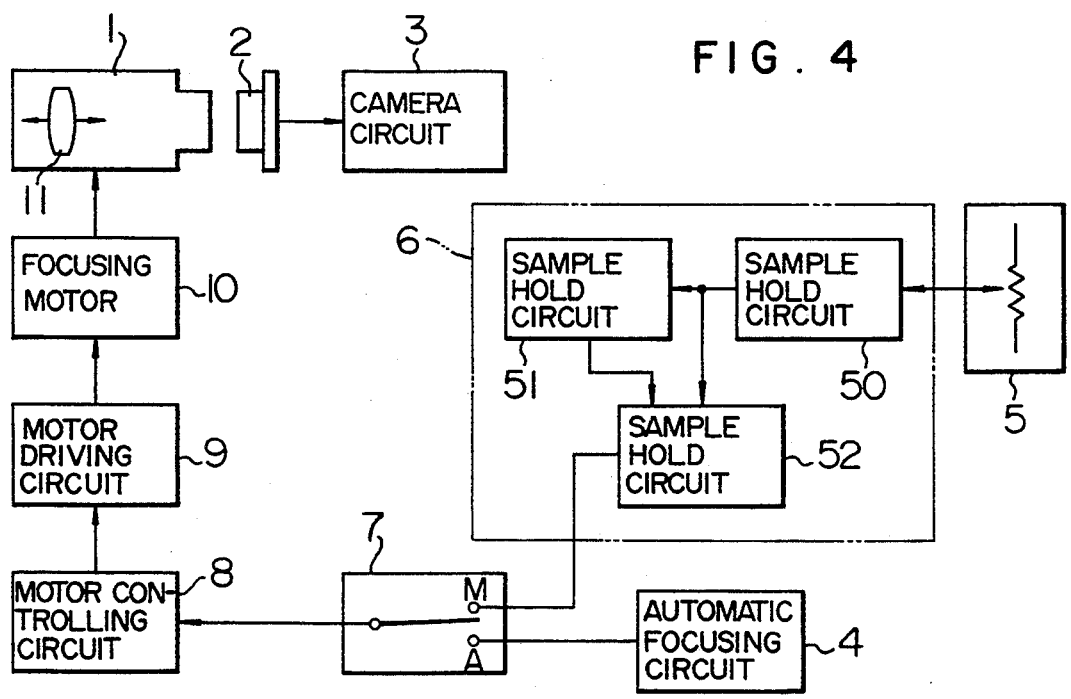
FIGS. 4 to 6 are block diagrams showing different embodiments of the present invention.

FIG. 4 is a block diagram showing a first embodiment of the present invention. In FIG. 4, reference numeral 1 designates a lens system, numeral 2 an image pickup element, numeral 3 a camera circuit, numeral 4 an automatic focusing circuit, numeral 5 a variable resistor as a manual focus adjustment means, numeral 6 a differential voltage detecting circuit, numeral 7 an automatic/manual (A/M) change-over circuit (switch), numeral 8 a focusing motor controlling circuit, numeral 9 a motor driving circuit, numeral 10 a focusing motor, and numeral 11 a focusing lens.

When the adjustment of focus by manual operation is desired, the change-over switch 7 is turned to the manual (M) side so that the automatic focusing circuit 4 is placed into a disconnected condition. Explanation of the automatic focusing circuit 4, the image pickup element 2 and the camera circuit 3 will be omitted since they do not belong to the subject matter of the present invention and can be provided with well known constructions or components. The automatic focusing circuit 4 may be based on any system such as an infrared ranging system or TTL projection system as disclosed by U.S. Pat. No. 4,672,456, IEEE International Conference on Consumer Electronics, pp. 140-141, 1986 and the above-mentioned prior art (A).

Next, explanation will be made of manual focus adjustment. A voltage outputted from a slider terminal of the variable resistor 5 for manual focus adjustment is inputted to the differential voltage detecting circuit 6 which includes sample hold circuits 50 and 51 and a subtracting circuit 52. The voltage $V_M$ outputted from the slider terminal of the variable resistor 5 is supplied to the sample hold circuit 50 and this voltage $V_M$ is held at an output terminal of the sample hold circuit 50. After the lapse of a predetermined interval or period of time, a voltage $V'_M$ on the slider terminal of the variable resistor 5 is inputted to the sample hold circuit 50. Then, the voltage $V_M$ is held at an output terminal of the sample hold circuit 51 while the voltage $V'_M$ is held at the output terminal of the sample hold circuit 50 The voltages $V_M$ and $V'_M$ are subtracted from each other by the subtracting circuit 52 which in turn produces a differential voltage $(V'_M - V'_M)$ representative of a change of the output voltage of the slider terminal of the variable resistor 5 detected at the predetermined interval of time. The differential voltage is inputted to the motor controlling circuit 8 through the automatic/manual change-over circuit 7.

The motor controlling circuit 8 supplies a motor control signal for the focusing motor 10 to the motor driving circuit 9 which in turn controls the driving of the focusing motor 10. The motor control signal corresponds to or is conformable to the plus/minus sign and absolute value of the differential voltage $(V'_M - V_M)$. The motor control signal causes the focusing motor 10 to rotate, for example, in a positive or forward direction in the case of $(V'_M - V_M) > 0$, to rotate, for example, in a negative or reverse direction in the case of $(V'_M - V_M) < 0$ and to stop in the case of $(V'_M - V_M) = 0$ and causes the focusing lens 11 to move by a distance corresponding to the absolute value $|V'_M - V_M|$. It is experimentally preferable that the above-mentioned predetermined interval of time is selected to be not longer than the order of the period of a vertical synchronizing signal of a video signal, taking a time lag from the manipulation of the variable resistor for manual focus adjustment to the rotational movement of the focusing motor into consideration.

According to the above-mentioned embodiment, the movement and stoppage of the focusing lens can be made in accordance with the direction and amount of rotational movement of the variable resistor for manual focus adjustment. Therefore, focusing with high precision can be realized even in the case of power focusing. Further, since the rotational movement of the variable resistor is only required, the apparatus is easy to deal with.

Figure 5:
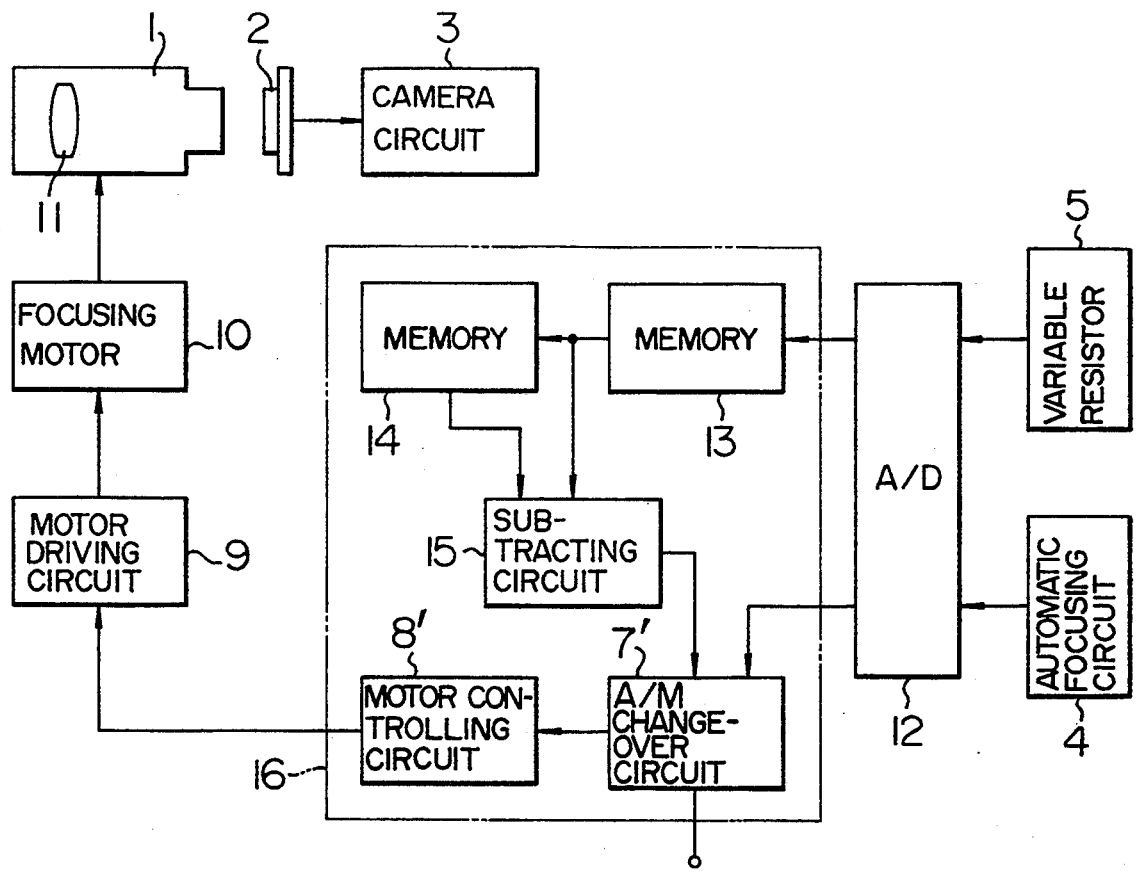

FIG. 5 is a block diagram showing a second embodiment of the present invention. Since components indicated in FIG. 5 by the same reference numerals or symbols as the components in the embodiment shown in FIG. 4 have the same functions and effects as the components of FIG. 4, explanation thereof will be omitted.

The embodiment of FIG. 5 differs from the embodiment of FIG. 4 in that signals outputted from a variable resistor 5 for manual focus adjustment and an automatic focusing circuit 4 are converted by an A/D converter circuit 12 into digital signals for digital signal processing.

A voltage $V_M$ outputted from the variable resistor 5 for manual focus adjustment is converted by the A/D converter 12 into a digital voltage signal $V_{MD}$ which in turn is stored into a memory 13. After the lapse of a predetermined interval of time, the signal $V_{MD}$ having been stored in the memory 13 is stored into a memory 14 while a new voltage $V'_M$ outputted from the variable resistor 5 for manual focus adjustment is converted by the A/D converter 12 into a digital voltage signal $V'_{MD}$ which in turn is stored into the memory 13 The digital voltage signals $V_{MD}$ and $V'_{MD}$ are subtracted from each other in a subtracting circuit 15 to detect or produce a digitalized differential voltage $(V'_{MD} - V_{MD})$.

The differential voltage $(V'_{MD} - V_{MD})$ is inputted to a motor controlling circuit 8' through an automatic/manual (A/M) change-over circuit 7'. Like the embodiment shown in FIG. 4, the motor controlling circuit 8' supplies, to a motor driving circuit 9 for control of the focusing motor 10, a motor control signal which causes the focusing motor 10 to rotate in a positive or forward direction in the case of $(V'_{MD}-V_{MD})>0$, to rotate in a negative or reverse direction in the case of $(V'_{MD}-V_{MD})<0$ and to stop in the case of $(V'_{MD}-V_{MD})=0$ while moving a focusing lens 11 by a distance corresponding to the absolute value $|V'_{MD}-V_{MD}|$ of the differential voltage.

As is apparent from the foregoing explanation, the memories 13 and 14 and the subtracting circuit 15 have the substantially same functions as the sample hold circuits 50 and 51 and the subtracting circuit 52 in the differential voltage detecting circuit 6 shown in FIG. 4, respectively and the automatic/manual change-over circuit 7' and the motor controlling circuit 8' have the substantially same functions as the circuits 7 and 8 in FIG. 4, respectively. Therefore, a function as a manual focus adjustment system is the same as that in the embodiment of FIG. 4. However, the embodiment shown in FIG. 5 has a merit that the apparatus requires no addition of any special circuit and can be simply and easily constructed as a focus adjustment system including an automatic focusing function since a digital processing part indicated by a box 16 in FIG. 5 can be simply realized by a microcomputer.

Figure 6:
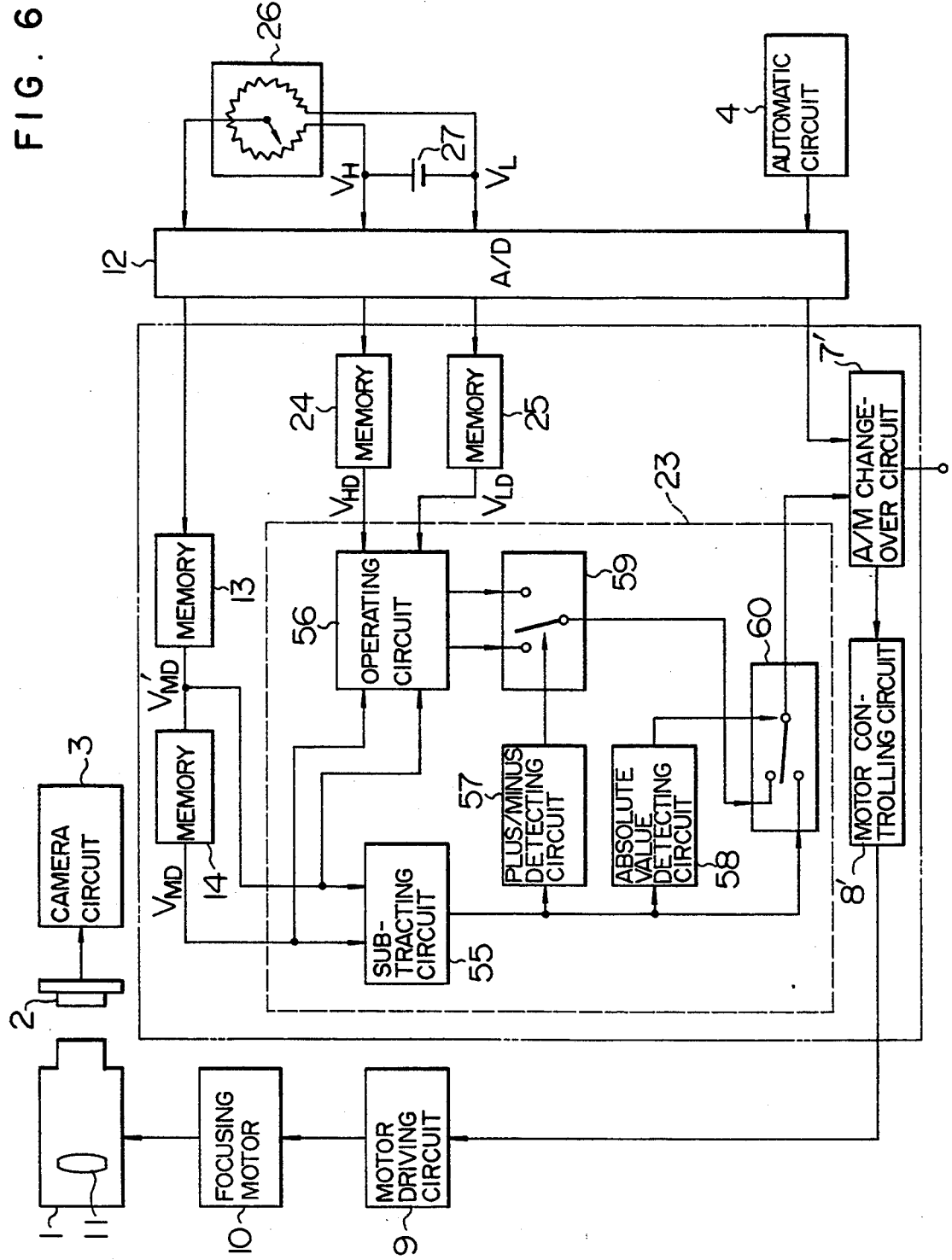

FIG. 6 is a block diagram showing a third embodiment of the present invention. Components designated in FIG. 6 by the same reference numerals or symbols as the components in the embodiments shown in FIGS. 4 and 5 have the same functions and effects as the components of FIGS. 4 and 5 and hence any detailed explanation thereof will be omitted.

The embodiment shown in FIG. 6 is different from the embodiments of FIGS. 4 and 5 in that an endless variable resistor having a slider which is freely or universally rotatable is used as a manual focus adjustment means so that a differential voltage corresponding to not the position of the slider of the endless variable resistor but the direction and amount of movement of the slider can be detected.

The quantity of a change in a voltage outputted from the slider of the endless variable resistor will first be explained by virtue of FIG. 7.

Figure 7:
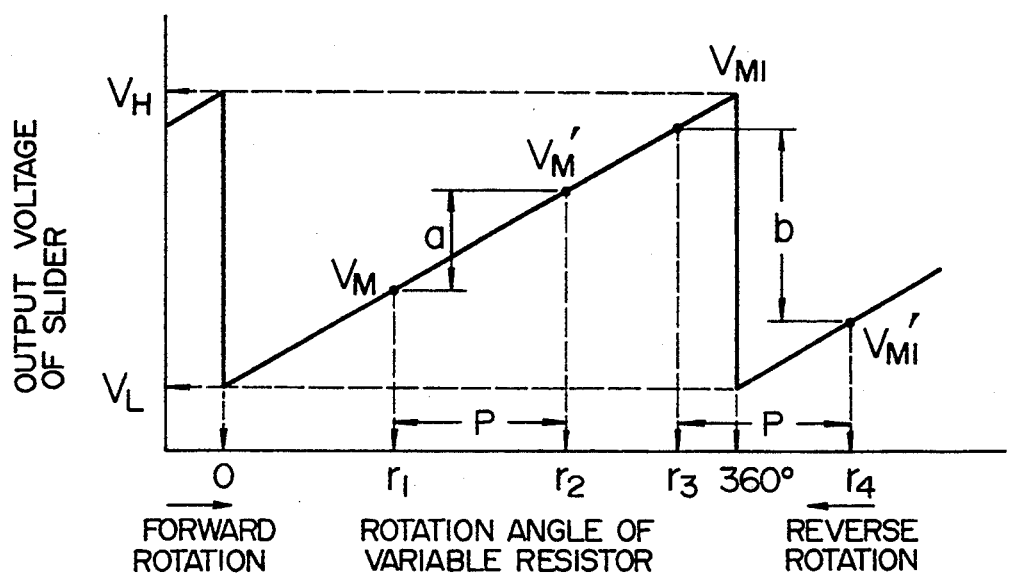
FIG. 7 is a characteristic view for explaining the principle of operation of the embodiment shown in FIG. 6.

FIG. 7 is a characteristic view showing an example of the characteristic of an output voltage of a slider of an endless variable resistor 26 of FIG. 6 with respect to the angle of rotation of the endless variable resistor. Provided that the endless variable resistor 26 shown in FIG. 6 is rotated by an angle from $r_1$ to $r_2$ indicated by P in FIG. 7, the output voltage of the slider of the endless variable resistor 26 changes from $V_M$ to $V'_M$ and the absolute value of a differential voltage corresponding to the quantity of the voltage change assumes $|V'_M-V_M|=a$.

On the other hand, when the endless variable resistor 26 is rotated by an angle from $r_3$ to $r_4$ indicated by P in FIG. 7, the absolute value of a differential voltage corresponding to the quantity of a change in the output voltage of the slider assumes $|V'_{M1}-V_{M1}|(=b$, notwithstanding that the rotation angle P from $r_3$ to $r_4$ is the same as the rotation angle P from $r_1$ to $r_2$. Namely, the mere subtraction does not provide a correct differential voltage for the output voltage of the slider which is linear for or proportional to the rotation angle of the endless variable resistor. However, a differential voltage a proportional to the rotation angle P can be represented by $a=(V_H-V_L-b)$ wherein $V_H$ and $V_L$ are the maximum and minimum values of the output voltage of the slider of the endless variable resistor. Namely, a desired differential voltage a can be calculated on the basis of b.

Also, if the maximum angle by which the endless variable resistor can rotate within a predetermined interval of time or a predetermined sampling period is not larger than 180°, the relations of $b \geq (V_H-V_L)/2$ and $a \leq (V_H-V_L)/2$ are satisfied. In other words, a mode of change from $r_1$ to $r_2$ and a mode of change from $r_3$ $r_4$ can be discriminately detected. Thus, as a correct differential voltage for a change in the output voltage of the slider of the endless variable resistor should be selected $V'_m-V_m$) when the absolute value $|V'_m-V_m|$ of the differential voltage for the above-mentioned change is equal to or smaller than $(V_H-V_L)/2$ and $(V_H-V_L)-(V'_M-V_M)$ when $|V'_M-V_m|$ is larger than $(V_H-V_L)/2$.

The above explanation has been made for the case where the output voltage of the slider is increased or the case where the differential voltage $(V'_M-V_M)$ for the quantity of change in the slider output voltage is larger than 0. On the other hand, in the case where the slider output voltage is decreased or the case where $(V'_M-V_M)$ is smaller than 0, $(V_H-V_L)-(V'_M-V_M)$ becomes equal to $2a+b$. Accordingly, when $(V'_M-V_M)$ is smaller than 0 $(V_L-V_H)-(V'_M-V_M)$ should be selected as a correct differential voltage for a change in the output voltage of the slider of the endless variable resistor.

In summary, a differential voltage conformable to the angle and direction of rotation of the endless variable resistor can be detected by taking, as a differential voltage for the output voltage of the slider of the endless variable resistor $(V'_M-V_M)$ in the case of $|V'_M-V_M| \leq (V_H-V_L)/2$, $(V_H-V_L)-(V'_M-V_M)$ in the case of $|V'_M-V_M|>(V_H-V_L)/2$ and $(V'_M-V_M)>0$, and $(V_L-V_H)-(V'_M-V_M)$ in the case of $|(V'_M-V_M|>(V_H-V_L)/2$ and $(V'_M-V_M)<0$.

As has already been mentioned, FIG. 6 shows the embodiment which can detect a differential voltage for the output voltage of the slider of the endless variable resistor conformable to the angle and direction of rotation of the endless variable resistor. In FIG. 6, reference numeral 26 designates an endless variable resistor for manual focus adjustment having a slider which is freely or universally rotatable, numeral 27 a power source for application of voltage to the endless variable resistor 26, and numeral 23 a differential voltage producing circuit.

Like the embodiment shown in FIG. 5, a voltage outputted from the slider of the endless variable resistor 26 is A/D converted by an A/D converter 12 and is stored into memories 13 and 14 as voltages $V_{MD}$ and $V'_{MD}$ detected at a predetermined interval of time. The maximum and minimum values $V_H$ and $V_L$ of a voltage applied from the power source 27 to the endless variable resistor 26 are stored into memories 24 and 25 after A/D conversion thereof by the A/D converter 12 and are then inputted as digital voltages $V_{HD}$ and $V_{LD}$ to the differential voltage producing circuit 23.

The differential voltage producing circuit 23 includes a subtracting circuit 55, an operating circuit 56, a plus/minus detecting circuit 57, an absolute value detecting circuit 58, and switching circuits 59 and 60. In the differential voltage producing circuit 23 a differential voltage $(V'_{MD}-V_{MD})$ produced by the subtracting circuit 55 is inputted to the plus/minus detecting circuit 57, the absolute value detecting circuit 58 and the switching 60 while either one of voltages $(V_{HD}-V_{LD})-(V'_{MD}-V_{MD})$ and $(V_{LD}-V_{HD})-(V'_{MD}-V_{MD})$ produced by the operating circuit 56 is selected through the switching circuit 59 and is then supplied to the switching circuit 60.

A control signal conformable to the plus/minus sign (positiveness/negativeness) of the differential voltage $(V'_{MD}-V_{MD})$ is produced at an output terminal of the plus/minus detecting circuit 57 and this control signal controls a change-over operation of the switching circuit 59. A control signal conformable to the results of comparison of the absolute value $|V'_{MD}-V_{MD}|$ of the differential voltage with $(V_{HD}-V_{LD})/2$ is produced at an output terminal of the absolute value detecting circuit 58 and this control signal controls a change-over operation of the switching circuit 60. As a result, from an output terminal of the switching circuit 60 is delivered a differential voltage signal which is $(V'_{MD}-V_{MD})$ in the case of $|V'_{MD}-V_{MD}| \leq (V_{HD}-V_{LD})/2$, $(V_{HD}-V_{LD})-(V'_{MD}-V_{MD})$ in the case of $|V'_{MD}-V_{MD}| > (V_{HD}-V_{LD})/2$ and $(V'_{MD}-V_{MD}) > 0$ and $(V_{LD}-V_{HD})-(V'_{MD}-V_{MD})$ in the case of $|V'_{MD}-V_{MD}| > (V_{HD}-V_{LD})/2$ and $(V'_{MD}-V_{MD}) < 0$ that is a signal which is conformable to the amount and direction of movement of the slider of the endless variable resistor 26.

By applying the differential signal to a motor controlling circuit 8' through an automatic/manual change-over circuit 7' to drive a focusing motor 10 in a manner similar to that explained in conjunction with the embodiment shown in FIG. 5, it is possible to move a focusing lens 11 in accordance with the amount and direction of movement of the slider of the endless variable resistor 26.

According to the present embodiment mentioned above, focusing with high precision can be attained, like the embodiments shown in FIGS. 4 and 5. Further, since the lens is moved in accordance with the amount of movement of the slider of the variable resistor, the above embodiments have a merit that there can be eliminated a lens jump phenomenon upon change-over from an automatic operation to a manual operation which phenomenon may otherwise take place in the case where a control is performed so as to make the position of the slider of the variable resistor and the position of the lens coincident with each other.

A digital circuit portion enclosed by dotted line in FIG. 6 is shown with a hardware construction but a function thereof can be realized by software by using a microcomputer.

Figure 8:
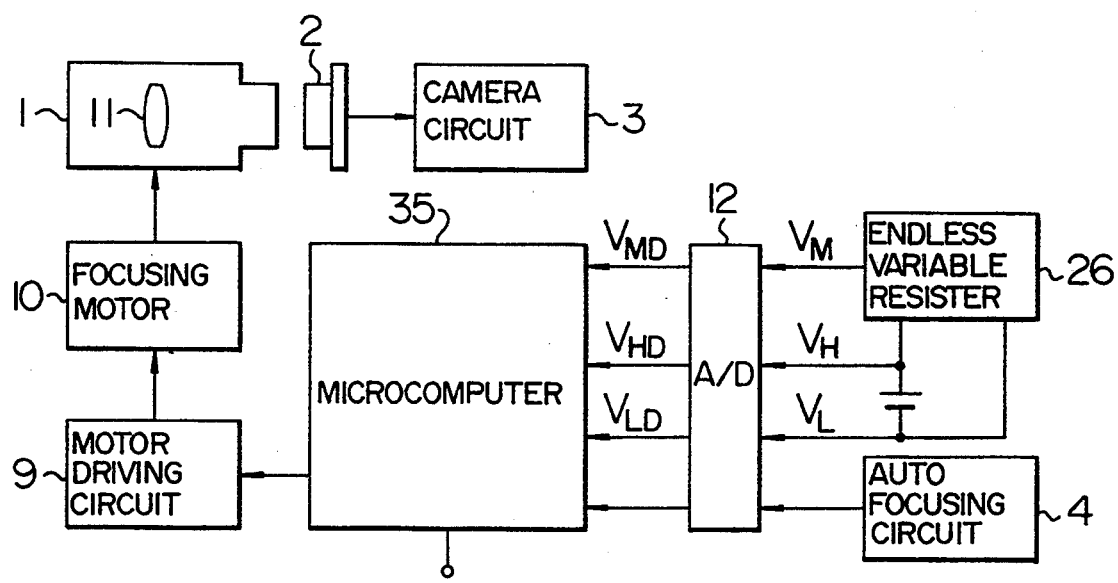
FIG. 8 is a block diagram showing a whole construction in the case where a function of the embodiment shown in FIG. 6 is realized by a microcomputer.
Figure 9:
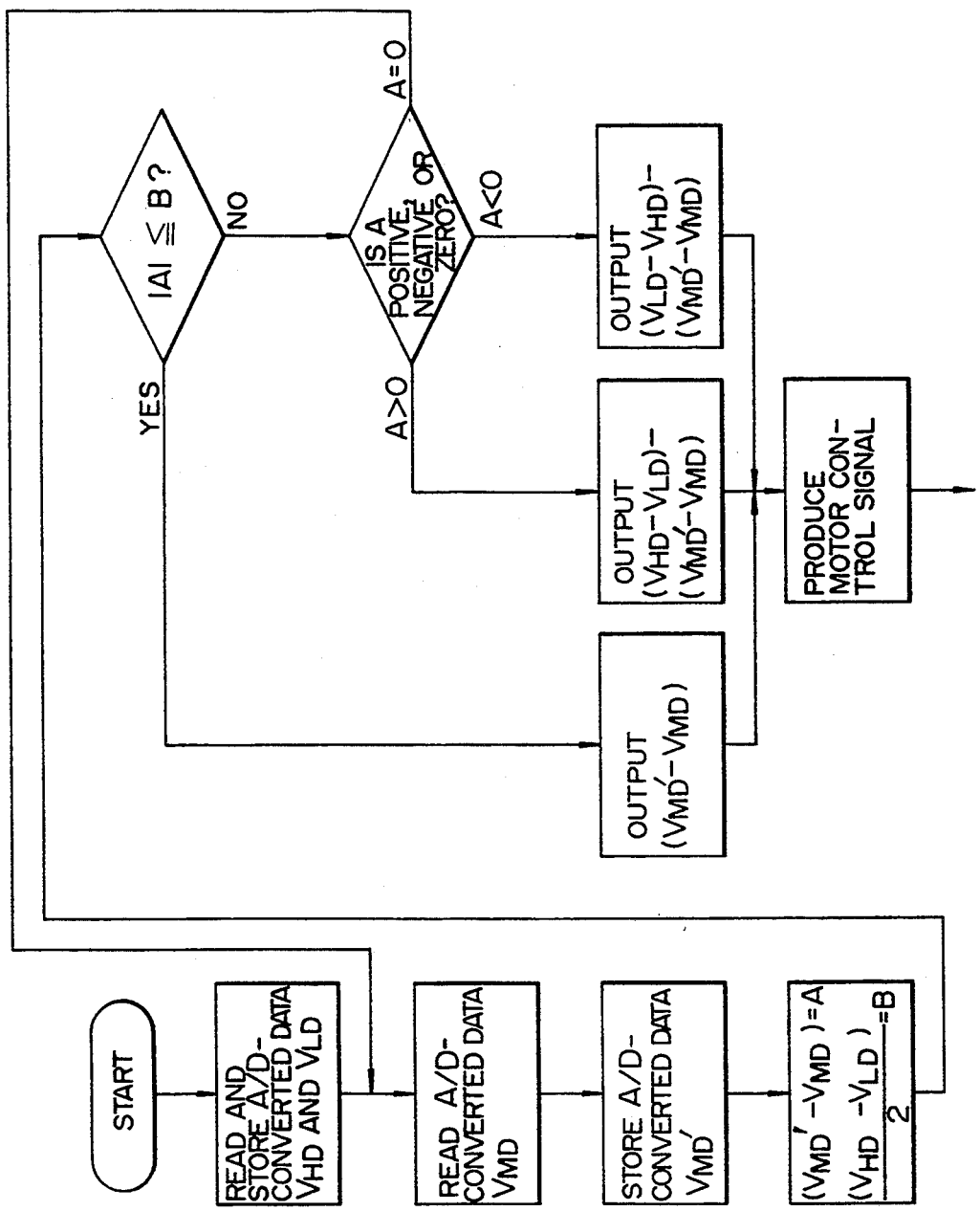
FIG. 9 is a flow chart showing the operation of the construction shown in FIG. 8.

FIG. 8 shows a whole construction in the case where a microcomputer 35 is used. The operation of the microcomputer 35 is shown by a flow chart of FIG. 9. The operation of the microcomputer 35 will be readily understood by referring to FIG. 9 since the procedure of operation illustrated in FIG. 9 is quite the same as the operation which has been explained in conjunction with FIGS. 6 and 7. Therefore, any explanation of FIGS. 8 and 9 will be omitted.

FIG. 10 is a block diagram showing a fourth embodiment of the present invention. Since components designated in FIG. 10 by the same reference numerals or symbols as the components in the embodiments shown in FIGS. 4, 5 and 6 have the same functions and effects as the components of FIGS. 4, 5 and 6, explanation thereof will be omitted.

The embodiment shown in FIG. 10 differs from the embodiments of FIGS. 4, 5 and 6 in that a manual focus adjustment means is constructed by use of a rotary encoder. Referring to FIG. 10, reference numeral 28 designates a differential voltage producing circuit, numeral 29 a pulse counting circuit, numeral 30 a direction detecting circuit, numerals 31 and 32 waveform shaping circuits, and numeral 33 a rotary encoder.

Figure 11A:
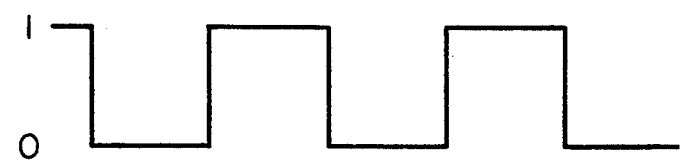
FIGS. 11A and 11B show waveforms for explaining the principle of operation in FIG. 10.
Figure 11B:
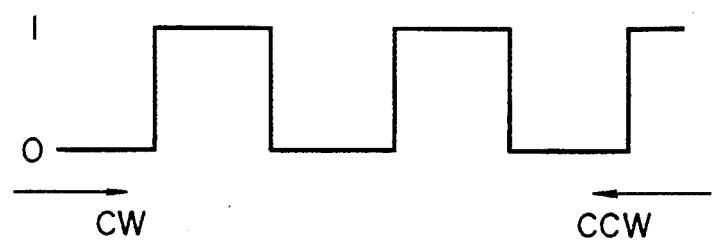

The operation of the embodiment shown in FIG. 10 will now be explained in reference with waveforms shown in FIGS. 11A and 11B.

The rotary encoder 33 is constructed to output signals different in phase from each other by a quarter ($\frac{1}{4}$) period. The output signals of the rotary encoder 33 are shaped by the waveform shaping circuits 31 and 32 which in turn provide, at their output terminals, A and B, pulse signals as shown in FIGS. 11A and 11B. The phase of the pulse signal on the output terminal A of the waveform shaping circuit 31 is delayed from that of the pulse signal on the output terminal B of the waveform shaping circuit 32 by a quarter period when the rotary encoder 33 is rotated, for example, in a positive (forward) or clockwise direction (or a direction indicated by arrow CW) and is in advance of that of the pulse signal on the output terminal B of the waveform shaping circuit 32 by a quarter period when the rotary encoder 33 is rotated in a negative (reverse) or counter clockwise direction (or a direction indicated by arrow CCW). The number of pulses in the pulse signal corresponds to the amount of rotation of the rotary encoder 33.

The pulse counting circuit 29 counts the number of pulses outputted from the waveform shaping circuit 31 within a predetermined interval or period of time. The direction detecting circuit 30 determines a level of the pulse signal on the output terminal B of the waveform shaping circuit 32 by virtue of the pulse signal on the output terminal A on the waveform shaping circuit 31 (for example, by the rise of the pulse signal) to detect the rotation of the rotary encoder 33 as forward rotation when the level of the pulse signal on the output terminal B is high ("1") and as reverse rotation when it is low ("0").

The differential voltage producing circuit 28 produces a differential voltage on the basis of the results of pulse counting by the pulse counting circuit 29 and the results of direction detection by the direction detecting circuit 30 in order to control a focusing motor 10, like the embodiments shown in FIGS. 4, 5 and 6, so that a focusing lens 11 is moved in accordance with the differential voltage such as $(V'_{MD}-V_{MD})$ in the embodiment shown in FIG. 5.

According to the present embodiment mentioned above, focusing with high precision can be performed with no inconvenience produced even upon change-over from automatic focusing to manual focusing, like the embodiment shown in FIG. 6.

Figure 2:
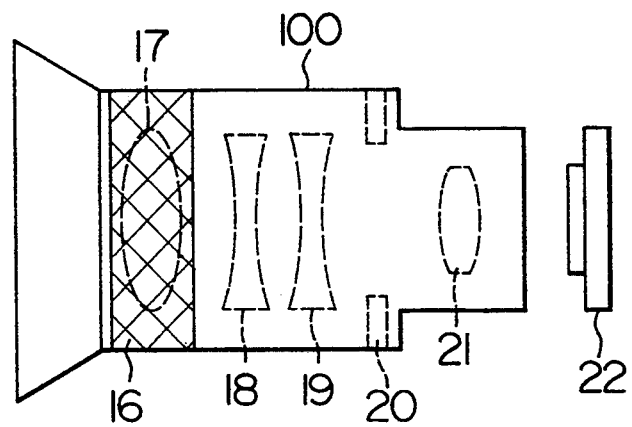
FIG. 2 is a view schematically showing the construction of the conventional video camera.

Generally, the object lens 17 in the lens system shown in FIG. 2 is used as the focusing lens 11 to be rotationally moved in the present invention. It is of course that the compensator lens group 19 (or a part thereof) or the imaging or master lens group 21 (or a part thereof) in the lens system shown in FIG. 2 can be used as the focusing lens 11. Alternatively, the sensor or image pickup element 22 may be moved for focus adjustment.

In the case where the compensator lens or imaging lens having a light weight is used as the focusing lens, a pulse motor having a small size and a small inertia can be used so that the influence of inertia or the like can be reduced. Since the amount of rotation of the pulse motor corresponds to the number of drive pulses applied thereto, the setting of the amount of movement of the lens can be easily made and the motor controlling circuit can be realized with a simple circuit construction. Further, since the position of the object lens is fixed, it is possible to design a small-sized and compact lens.

Figure 12:
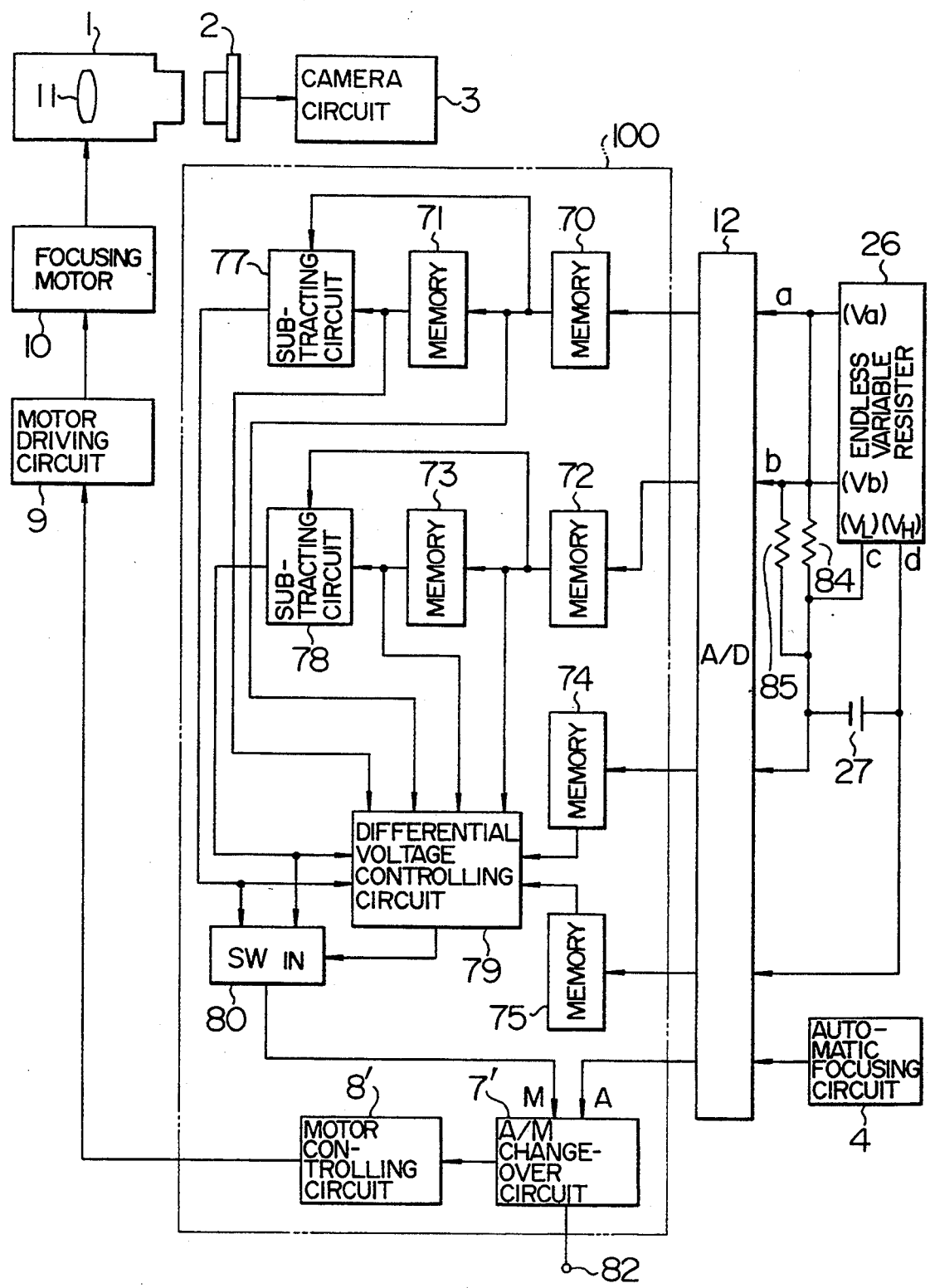
FIG. 12 is a block diagram showing another embodiment of the present invention.
Figure 13:
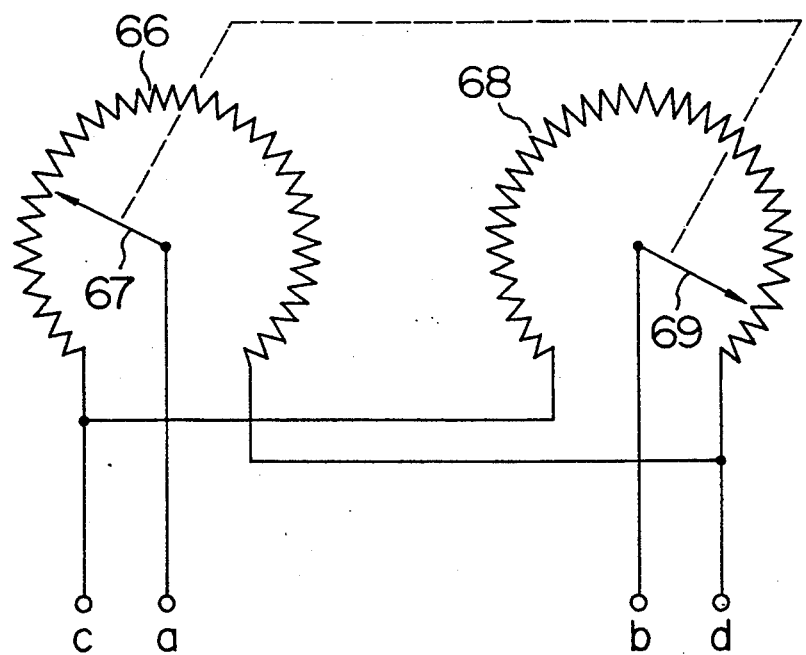
FIG. 13 is a view showing an example of the construction of a variable resistor used as a manipulator in the embodiment shown in FIG. 12.
Figure 14:
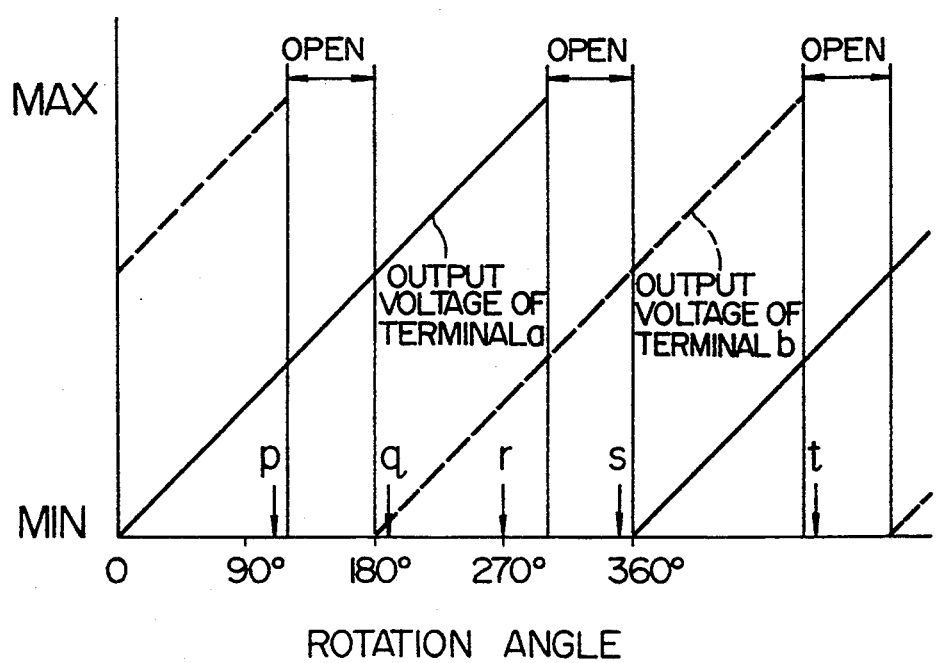
FIG. 14 is a characteristic view for explaining the principle of operation of the embodiment shown in FIG. 12.

FIG. 12 is a block diagram showing another embodiment of the present invention, FIG. 13 is a view showing an example of the construction of an endless variable resistor as a manual focus adjustment means used in the embodiment shown in FIG. 12, and FIG. 14 is a characteristic view showing the change of a resistance value of the endless variable resistor of FIG. 13 with respect to the angle of rotation thereof.

The manual focus adjustment means will first be explained by virtue of FIGS. 13 and 14.

In FIG. 13, reference numerals 66 and 68 designate resistor elements each of which is configured into a circular arc shape, and numerals 67 and 69 designate 'sliders. The sliders 67 and 69 freely or universally rotate interlocking with each other while contacting the resistor elements 66 and 67 respectively. The sliders 67 and 69 have a positional relation different in phase from each other by a predetermined angle, for example, 180°. When a voltage is applied between terminals c and d of the variable resistor shown in FIG. 13, output voltages on terminals a and b exhibit such changes with respect to the rotation angles of the sliders 67 and 69 as shown in FIG. 14. Namely, a voltage corresponding to not the position of rotation but the direction and amount of rotation can be detected from at least one of the sliders 67 and 69.

FIG. 12 shows in block diagram an example of a power focusing device in which the variable resistor shown in FIG. 13 is used as a manual focus adjustment means. Components designated in FIG. 12 by the same reference numerals as the components shown in FIG. 6 have the same functions as the components of FIG. 6 and hence any further explanation thereof will be omitted. In FIG. 12, reference numeral 26 designates an endless variable resistor for manual focus adjustment shown in FIG. 13, numerals 70 to 75 memories, numerals 77 and 78 subtracting circuits, numeral 79 a differential voltage controlling circuit, numeral 80 a switching circuit, and numeral 82 an automatic/manual change-over terminal. In response to the application of a control signal to the automatic/manual change-over terminal 82, an automatic/manual change-over circuit 7' operates to selectively deliver a signal outputted from an automatic focusing circuit 4 through an A/D converter 12 and a signal outputted from the switching circuit 80.

The following explanation will be made defining an output voltage from the terminal a of the as $V_a$, an output voltage from the terminal b as $V_b$, endless variable resistor 26 for manual focus adjustment a voltage on the terminal c as $V_L$ and a voltage on the terminal d as $V_H$.

The voltages $V_a$ and $V_b$ outputted from the sliders of the endless variable resistor 26 are converted by the A/D converter 12 into digital voltage signals (hereinafter referred to as $V_{aD}$ and $V_{bD}$, respectively) and are stored into the memories 70 and 72. After the lapse of a predetermined interval of time, $V_{aD}$ and $V_{bD}$ having been stored in the memories 70 and 72 are respectively transferred to the memories 71 and 73 and new voltages $V'_{aD}$ and $V'_{bD}$ are stored into the memories 70 and 72 $V'_{aD}$ and $V'_{bD}$ are the digital forms of voltages $V'_a$ and $V'_b$ outputted from the endless variable resistor 26 after the lapse of the predetermined interval of time and digitalized by the A/D converter 12. The voltages $V'_{aD}$ and $V_{aD}$ stored in the memories 70 and 71 are subtracted from each other by the subtracting circuit 77 which in turn produces a differential voltage ($V'_{aD}-V'_{aD}$). The voltages $V'_{bD}$ and $V_{bD}$ stored in the memories 72 and 73 are subtracted from each other by the subtracting circuit 78 which in turn produces a differential voltage ($V'_{bD}-V_{bD}$) Each of those differential voltages is inputted to the differential voltage controlling circuit 79 and the switching circuit 80.

The endless variable resistor 26 for manual focus adjustment has an open area where the slider does not exist on the resistor element, as is shown in FIG. 14. In the open area, the slider output voltage is unstable. A resistor 84 or 85 is provided for fixing the terminal voltage into a predetermined value. If the value of each of the resistors 84 and 85 is selected to be sufficiently larger than the value of the resistor element of the endless variable resistor 26 and to be sufficiently smaller than an input resistance of the A/D converter 12, the output voltage of the slider in the open area becomes substantially equal to the voltage $V_L$ on the terminal c. Accordingly, it is possible to detect the open area by comparing the output voltage from the slider with $V_L$. Thus, voltages $V_L$ and $V_H$ of opposite ends of a power source 27 for application of a voltage to the endless variable resistor 26 are stored into the memories 74 and 75 after A/D conversion thereof by the A/D converter 12 and are supplied as voltages $V_{LD}$ and $V_{HD}$ to the differential voltage controlling circuit 79. Also, voltages $V'_{aD}$, $V_{aD}$, $V'_{bD}$, and $V_{bD}$ stored in the memories 70, 71, 72 and 73 are supplied to the differential voltage controlling circuit 79. The differential voltage controlling circuit 79 compares the voltages $V'_{aD}$, $V_{aD}$, $V'_{bD}$ and $V_{bD}$ from the memories 70 to 73 with the voltage $V_{LD}$ from the memory 74 to supply a control signal to the switching circuit 80 so that the switching circuit 80 delivers ($V'_{bD}-V_{bD}$) when either one of both of $V'_{aD}$ and $V_{aD}$ is equal to $V_{LD}$ and ($V'_{aD}-V_{aD}$) when either one or both of $V'_{bD}$ and $V_{bD}$ is equal to $V_{LD}$. In this manner, the differential voltage controlling circuit 79 detects the open area and supplies to the switching circuit 80 the control signal which selects the differential voltage ($V'_{aD}-V_{aD}$) derived from the terminal a the endless variable resistor. 26 or the differential voltage ($V'_{bD}-V_{bD}$) derived from the terminal b thereof.

For example, in the case where the sliders 67 and 79 rotates from s to t in FIG. 14 within a predetermined interval of time (or a sampling period), each of the output voltages of the two sliders 67 and 69 encounters its open area. In such a case, therefore, it is not possible to detect a normal or correct differential voltage. However, if the predetermined interval of time or sampling period is selected such that the slider does not rotate over an angle range larger than 120° within one sampling period, for example, when the open area has a span of 60°, there is satisfied a condition that at least one of the two sliders does not enter its open area, thereby making it possible to detect a normal differential voltage. It has been experimentally found that such a condition can be satisfied by setting the predetermined interval of time or sampling period to be not larger than the order of the period of a vertical synchronizing signal of a video signal.

In the case where the sliders rotate, for example, from p to q or from q to r in FIG. 14, during the predetermined interval of time, any open area is not detected from at least one of the output voltages of the two sliders. In such a case, the absolute values $|V'_{aD}-V_{aD}|$ and $|V'_{bD}-V_{bD}|$ of the differential voltages produced from the two slider output voltages are compared with each other, and the control signal to be supplied to the switching circuit 80 is one which causes the switching circuit 80 to selectively output either $(V'_{aD}-V_{aD})$ or $(V'_{bD}-V_{bD})$ in the case $|V'_{aD}-V_{aD}|=|V'_{bD}-V_{bD}|$ which means that none of the two differential voltages encounter their open areas, $(V'_{bD}-V_{bD})$ in the case of $|V'_{aD}-V_{aD}|>|V'_{bD}-V_{bD}|$, and $(V'_{bD}-V_{bD})$ in the case of $|V'_{aD}-V_{aD}|<|V'_{bD}-V_{bD}|$. The differential voltage thus selected and outputted is supplied to a motor controlling circuit 8' through the automatic/manual change-over circuit 7'. The motor controlling circuit 8' supplies a control signal to a motor driving circuit 9 for driving of a focusing motor 10 which control signal causes a focusing lens 11 to move in a direction corresponding to the plus/ minus sign (positiveness/negativeness) of the differential voltage and by a distance corresponding to the absolute value of the differential voltage.

Figure 15:
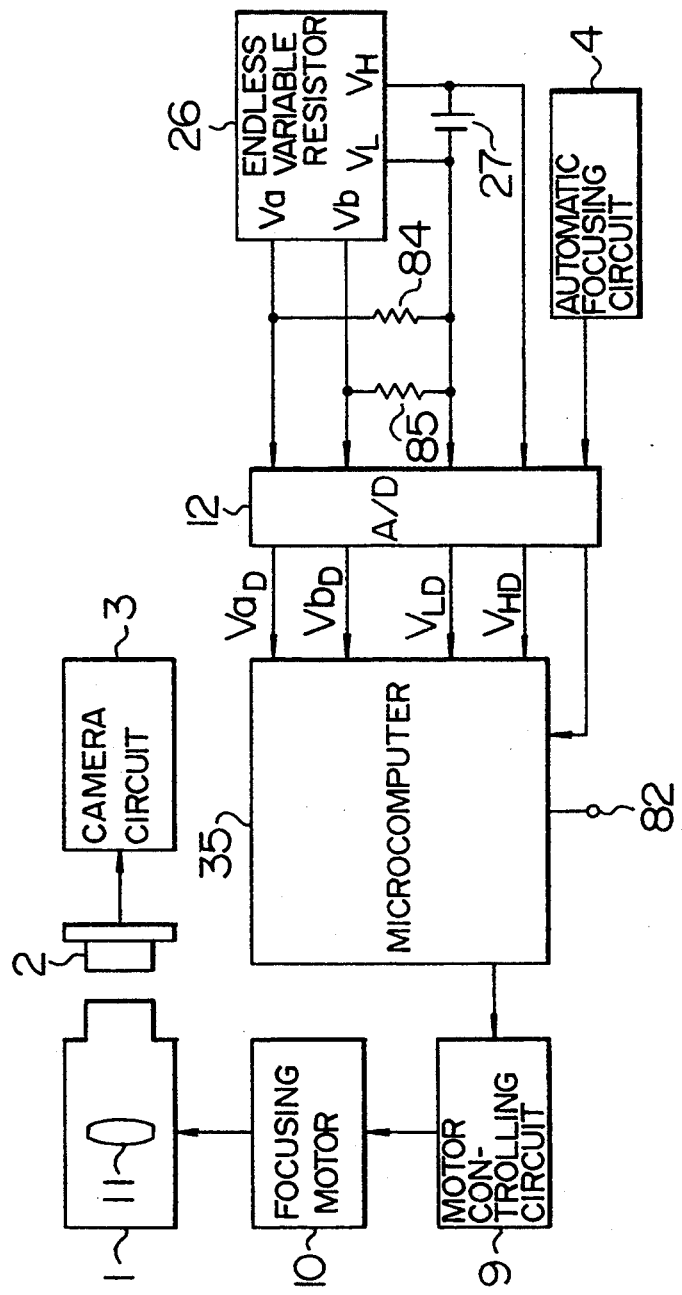
FIG. 15 is a block diagram showing a whole construction in the case where a function of the embodiment shown in FIG. 12 is realized by a microcomputer.
Figure 16:
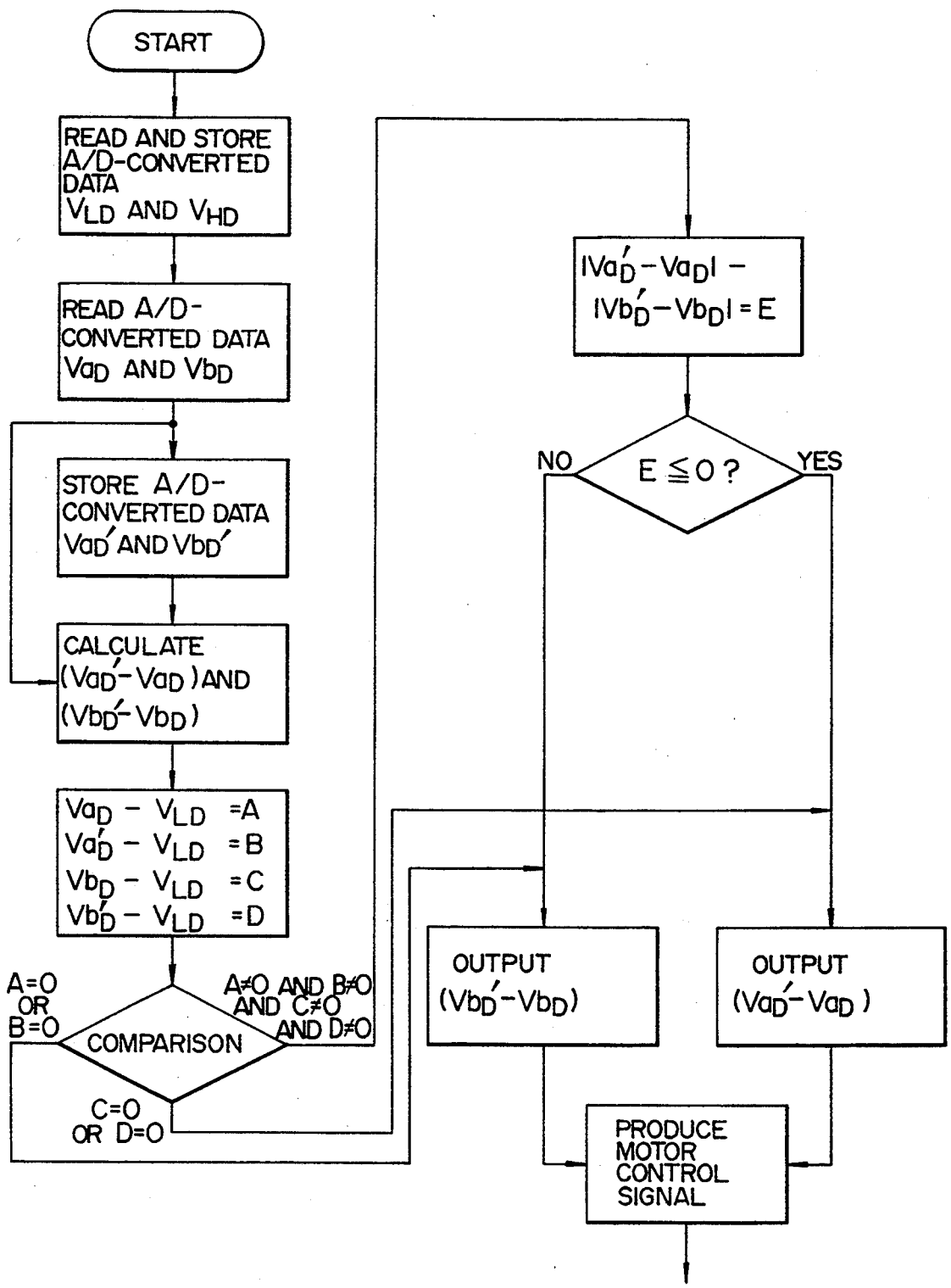
FIG. 16 is a flow chart showing the operation of the construction shown in FIG. 15.

According to the present embodiment, since the direction and amount of rotational movement of the variable resistor can be detected irrespective of the position of rotational movement of the variable resistor, it is possible to take the focus smoothly and with high precision. If a digital processing portion 100 enclosed by dotted chain line in FIG. 12 is realized with software by use of a microcomputer 35 as shown in FIG. 15, it will be easily understood that the microcomputer 35 assumes an operation as shown in FIG. 16. In that case, the addition of any special circuit is not required and the apparatus can be simply and easily constructed as a focus adjustment system including an automatic focusing function.

In a zoom lens for a video camera or the like, it is necessary to divide the whole movement range of a focusing lens into 300 to 500 parts, though the desired number of divisional parts depends on a tolerable resolution for stop position, a zoom ratio and/or a possible in-focus range. Now provided that in the embodiment shown in FIG. 12 the resolution of the A/D converter 12 is 8 bits (corresponding to the division into 256 parts) and the open area of the endless variable resistor 26 for manual focus adjustment spans 60°, a continuously variable resistance area of the variable resistor 26 over 300° (360°-60°) is divided into 256 parts. Accordingly, the endless variable resistor 26 must be rotationally moved over about 350°-590° in order to divide the whole movement range of the focusing lens from its near extreme to the extreme of ∞ into 300-500 parts. If the size of a knob attached to a rotation shaft of the endless variable resistor is made small, such a rotational angle does not provide any inconvenience since it is one over which the variable resistor can be rotationally moved with no need of re-gripping the knob. However, in the case where the knob cannot be made small, for example, from the point of view on design as an article, the movement of the focusing lens from its near extreme to the extreme of ∞ requires the rotational movement of the endless variable resistor which includes re-gripping the knob two or three times, thereby deteriorating the workability. Though the deterioration of the workability can be prevented by enhancing the resolution of the A/D converter, the cost of the resultant apparatus becomes high.

Figure 17:
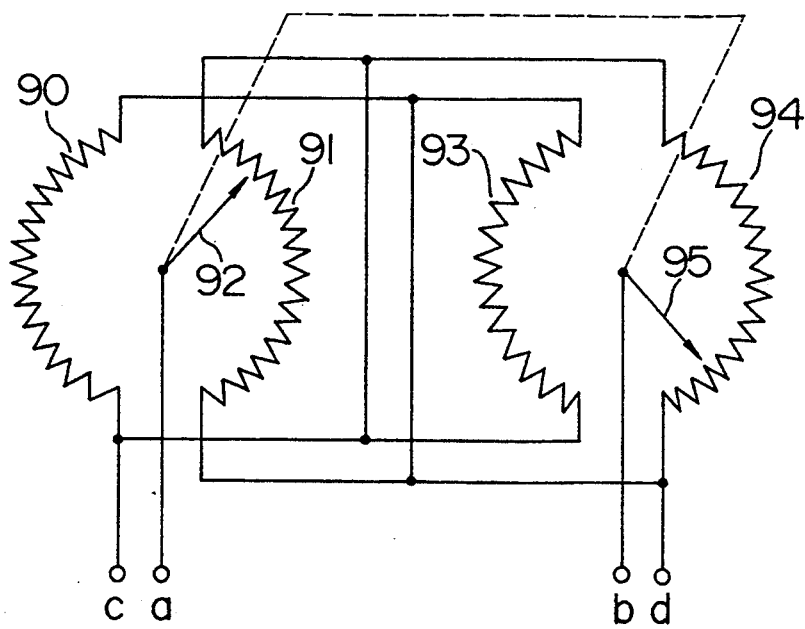
FIG. 17 shows another example of the construction of the variable resistor used in the embodiment shown in FIG. 12.
Figure 18:
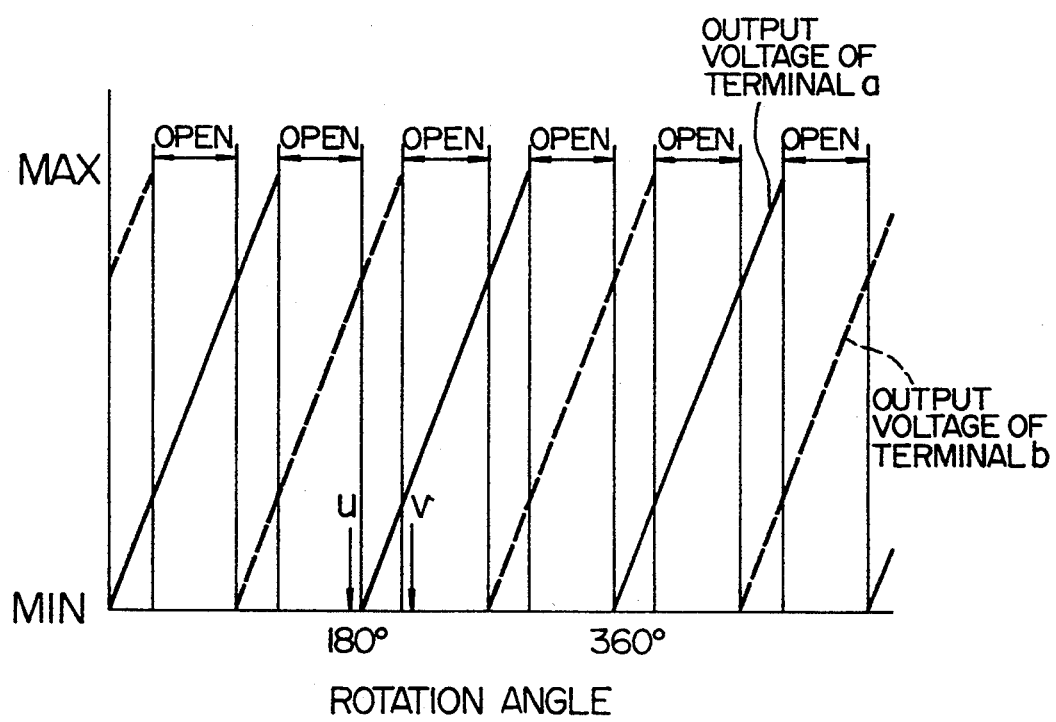
FIG. 18 is a characteristic view for the example shown in FIG. 17.

FIG. 17 shows another example of the construction of an endless variable resistor for manual focus adjustment, and FIG. 18 is a characteristic view showing the change of a resistance value of the variable resistor shown in FIG. 17 with respect to the angle of rotation thereof. Terminals a to d of the variable resistor shown in FIG. 17 correspond to the terminals a to d of the variable resistor shown in FIG. 13, and a system as a power focusing device can be constructed without any change in circuit operation by merely replacing the endless variable resistor 26 for manual focus adjustment shown in FIG. 12 by the variable resistor shown in FIG. 17. Therefore, any detailed explanation of the power focusing device will be omitted.

In FIG. 17, reference numerals 90 and 91 designate concyclic resistor elements each configured into a circular arc shape, numeral 93 and 94 concyclic resistor elements each configured into a circular arc shape, and numerals 92 and 95 sliders which can freely or universally rotate while contacting the resistor elements 90, 91 and 93, 94. The sliders 92 and 95 rotationally move interlocking with each other in a positional relation different in phase from each other by a predetermined angle, for example, 90°. When the sliders are rotated while applying a voltage between the terminals c and d, output voltages of the terminals a and b exhibit such changes with respect to the rotation angle as shown in FIG. 18. Namely, in the case where the sliders are rotated over 360°, each of the terminals a and b of the variable resistor shown in FIG. 17 changes twice from the minimum (MIN) voltage to the maximum (MAX) voltage though each of the terminals a and b of the variable resistor shown in FIG. 13 changes once from the MIN voltage to the MAX voltage. In the present embodiment, therefore, when the open area of the variable resistor spans 60°, the resolution of the A/D converter is 8 bits and the whole movement range of the focusing lens is divided into 500 parts, the movement of the focusing lens from its near extreme to the extreme of ∞ can be effected by merely making the variable resistor rotationally move over about 240° since a resistance area of the variable resistor over 120° can be divided into 256 parts. In the present embodiment, in the case where both the outputs of the terminals a and b of the sliders of the variable resistor encounter their open areas, for example, in the case where the sliders move from u to v in FIG. 18, it is not possible to correctly detect a differential voltage conformable to the angle of rotation, as has been pointed out in conjunction with the embodiment shown in FIGS. 12 to 14. Therefore, for example, provided that the open area spans 60°, it is proper to set the predetermined interval of time or sampling period such that the sliders do not rotate over an angle range larger than 30° within one sampling period since the effective angle is 120° and the angle between the sliders is 90°.

As has been mentioned above, according to the present embodiment, a power focusing device capable of moving the focusing lens from its near extreme to the extreme of ∞ even for a small rotation angle of the sliders of the variable resistor can be realized at a low cost without any need of enhancing the resolution of the A/D converter but by merely using the variable resistor shown in FIG. 17.

Figure 19:
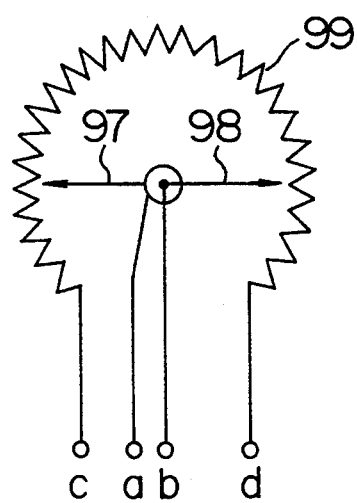
FIGS. 19 and 20 show further examples of the construction of the variable resistor.
Figure 20:
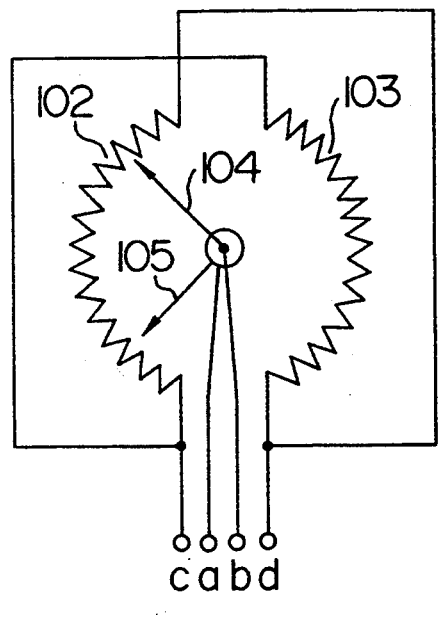

In the embodiments shown in FIGS. 13 and 17, the endless variable resistor has been explained as a manual focus adjustment means. However, the endless variable resistor is not limited to the structures shown in FIGS. 13 and 17 so long as it has a structure by which the direction and amount of rotational movement are detectable over the whole rotation range of 360°. For example, there may be employed a structure as shown in FIG. 19 in which interlocking sliders 97 and 98 disposed at positions different from each other by a predetermined angle, for example, 180° are rotationally moved while contacting a resistor element 99 configured into a circular arc shape or a structure as shown in FIG. 20 in which interlocking sliders 104 and 105 disposed at positions different from each other by a predetermined angle, for example, 90° are rotationally moved while contacting concyclic resistor elements 102 and 103 each of which is configured into a circular arc shape. The number of resistor elements and the number of sliders may be arbitrary so long as an endless variable resistor as a manual focus adjustment means can be constructed so as to allow the detection of the direction and amount of rotational movement over the whole angle range of 360°.

Figure 21:
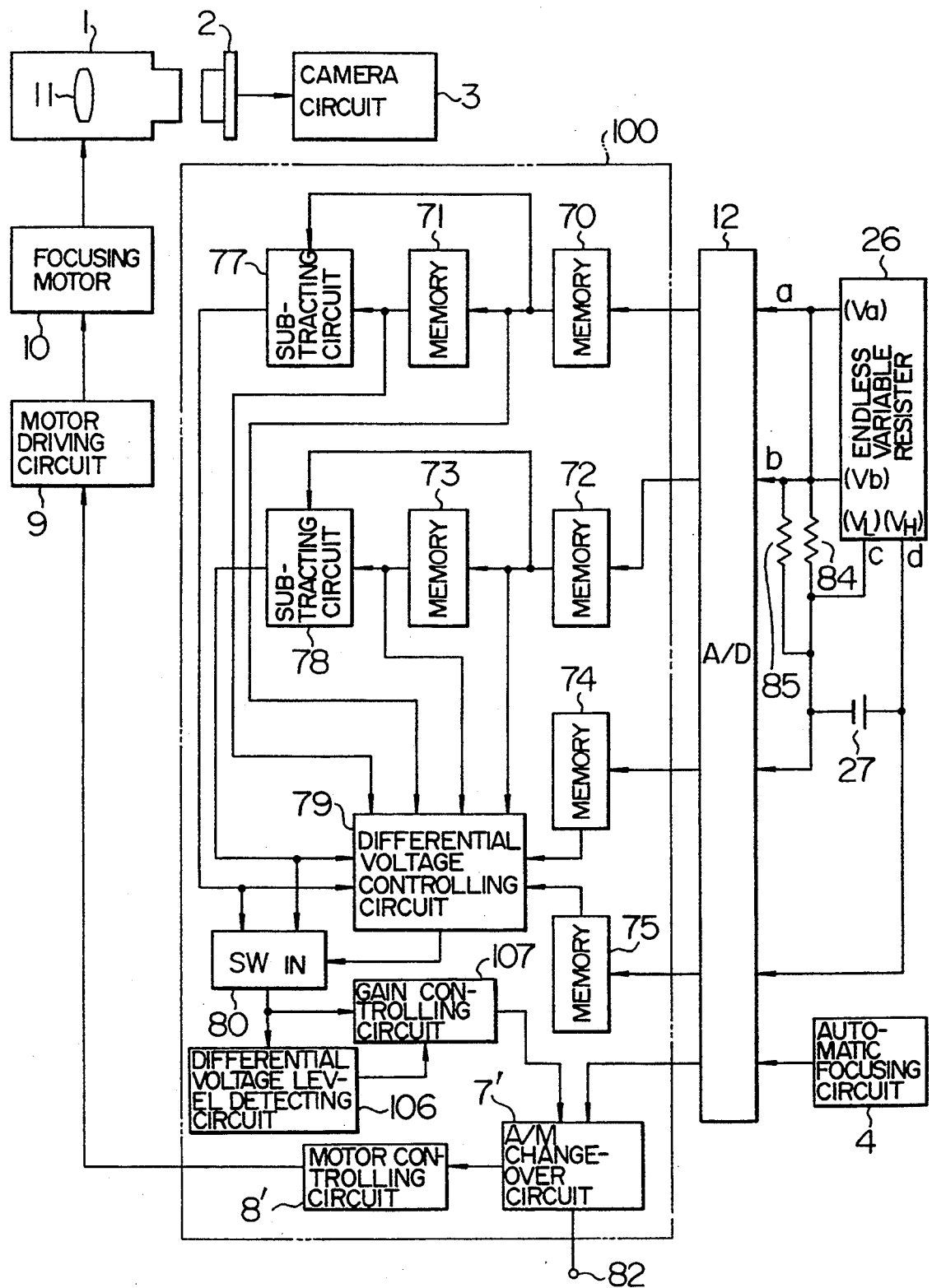
FIG. 21 is a block diagram showing a further embodiment of the present invention in which an additional function is provided.

FIG. 21 shows in block diagram a further embodiment of the present invention. Since components indicated in FIG. 21 by the same reference numerals or symbols as the components shown in FIG. 12 have the same functions and effects as the components of FIG. 12, explanation thereof will be omitted. The present embodiment differs from the embodiment of FIG. 12 in that a differential voltage level detecting circuit 106 and a gain controlling circuit 107 are provided to control the amount of movement of a focusing lens 11 in accordance with the speed of rotational movement of an endless variable resistor 26 for manual focus adjustment. A method of producing a differential voltage conformable to the direction and amount of rotational movement of the endless variable resistor for manual focus adjustment is similar to the embodiment shown in FIG. 12 or either one of differential voltages $(V'_{aD}-V_{aD})$ and $(V'_{bD}-V_{bD})$ is selected at the output of a switching circuit 80. For convenience of explanation, the differential voltage selectively outputted from the switching circuit 80 will be hereinafter defined as $(V'_D-V_D)$ The differential voltage $(V'_D-V_D)$ is supplied to the differential voltage level detecting circuit 106 and the gain controlling circuit 107. In the differential voltage level detecting circuit 106, the absolute value of the differential voltage $(V'_D-V_D)$ is compared with a predetermined level $V_{th}$, and signals of, for example, "L" and "H" are supplied to the gain controlling circuit 107 in the cases of $|V'_D-V_D|<V_{th}$ and $|V'_D-V_D|\geq V_{th}$, respectively. The gain controlling circuit 107 controls the gain in response to the "L" or "H" signal. For example, the gain controlling circuit 107 gives once gain to output $(V'_D-V_D)$ as it is when the "L" signal is supplied and doubles the gain to output $2(V'_D-V_D)$ when the "H" signal is supplied The gain-controlled differential voltage is supplied to a motor controlling circuit 8' through an automatic/manual change-over circuit 7'. The motor controlling circuit 8', a motor driving circuit 9, a focusing motor 10 and the focusing lens 11 have functions similar to those of equivalent components in the embodiment shown in FIG. 12 and the focusing lens 11 is moved in accordance with the plus/minus sign and absolute value of the gain-controlled differential voltage.

As has been mentioned above, according to the present embodiment, the amount of movement of the focusing lens can be controlled in accordance with the speed of rotational movement of the endless variable resistor for manual focus adjustment. The foregoing explanation has been made in conjunction with an example in which the speed of rotational movement of the endless variable resistor for manual focus adjustment is divided into two levels in such a manner that the speed of movement of the focusing lens is doubled when the rotational movement speed is fast. However, it is of course that the rotational movement speed may be divided into a plurality of desired levels so as to move the focusing lens at desired speeds.

Also, the endless variable resistor 26 for manual focus adjustment used in the present embodiment may be one shown in FIG. 13 or one shown in FIG. 17, and it is possible to use the variable resistors properly in accordance with the number of divisional parts of the whole movement range of the focusing lens or in accordance with different types of apparatuses.

According to the above-mentioned embodiment in which a plurality of levels are provided for the rotational movement speed of the variable resistor or the movement speed of the focusing lens, it is possible to move the focusing lens over the whole movement range, for example, from its near extreme to the extreme of $\infty$, even for a small rotation angle of the sliders of the variable resistor with no need of enhancing the resolution of the A/D converter while keeping in-focus precision. Also, if a digital processing portion 100 enclosed in FIG. 21 by dotted chain line is constructed by a microcomputer, the apparatus can be simply and easily constructed as a focus adjustment system including an automatic focusing function.

Figure 1:
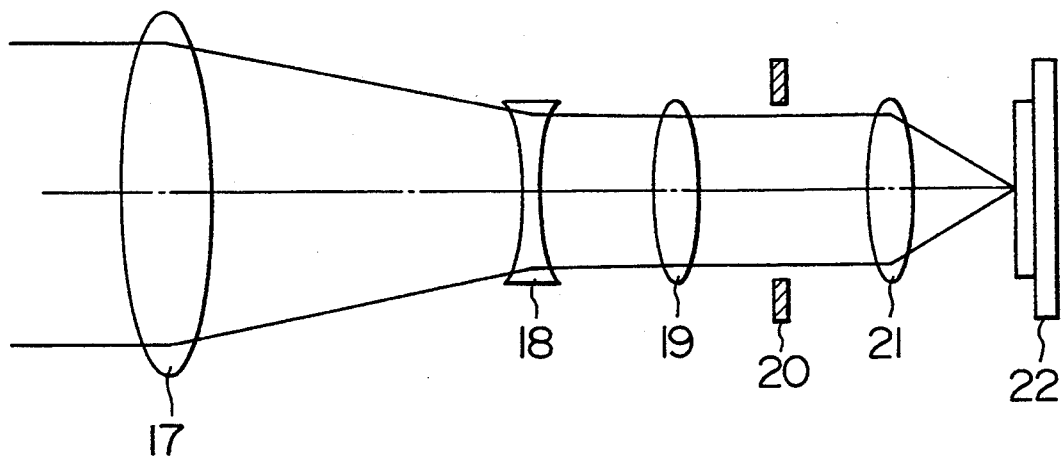
FIG. 1 shows a schematic view of an optical system of a general video camera.

In the embodiments shown in FIGS. 12 and 21, no limited explanation is made of the focusing lens 11. It is of course that the object lens group 17, the compensator lens group 19 (or a part thereof) or the master lens group 21 (or a part thereof) in the lens system shown in FIG. 1 may be used as the focusing lens 11. Alternatively, the image pickup element 22 may be moved to take the focus. In the case where the compensator lens or master lens having a light weight is used as the focusing lens, a motor having a small size and a small inertia can be used so that the influence of inertia or the like can be reduced. If a motor such as a step motor capable of being pulse-driven, the setting of the movement amount of the focusing lens can be facilitated.

Figure 3:
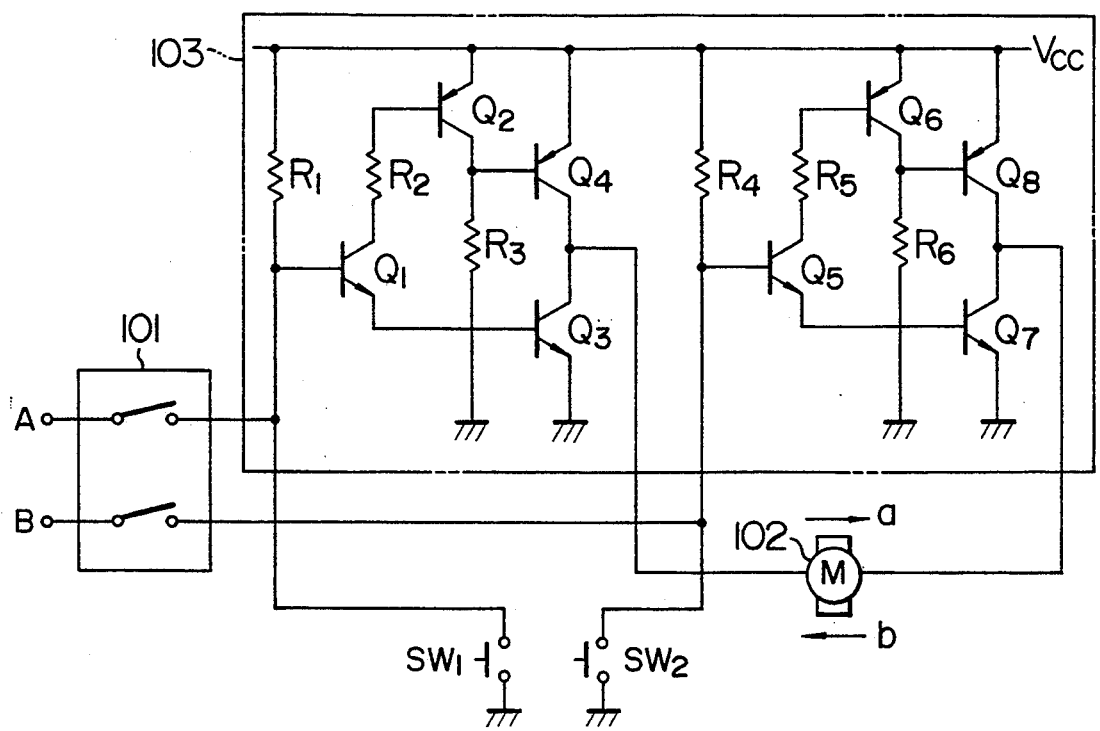
FIG. 3 is a circuit diagram showing an example of a motor driving circuit suitable for the conventional power focusing device.

In a general video camera, a focus ring for lens is subjected to directly hand-worked rotational movement operation. Therefore, focus adjustment can be rapidly and with good precision. However, for a macro imaging region nearer than a usual imaging region ($\infty \sim 1$ m), focus adjustment must be made through operation of a zoom ring, thereby making the workability poor. On the other hand, in the conventional power focusing system in which focus adjustment over a range from the macro imaging region to the usual imaging region can be effected by one knob, focus adjustment is made by button switch operation as shown in FIG. 3. Namely, it does not employ a method in which a focus ring for lens is subjected to direct rotational movement. Therefore, this system has a feeling in operation different from the movement operation of the focus ring for lens and is hard to deal with.

Embodiments of the present invention which will be explained in below concern a manual focusing device in which a focus adjustment ring similar to a focus ring for object lens 17 is subjected to direct rotational movement operation to move a lens(es) other than the object lens 17 or the sensor (image pickup element) 22 to take the focus, whereby focus adjustment can be made through the same operation in feeling as the rotational movement operation of a focus ring for object lens for focus adjustment and continuously, smoothly and finely from the usual imaging region to the macro imaging region.

Figure 22:
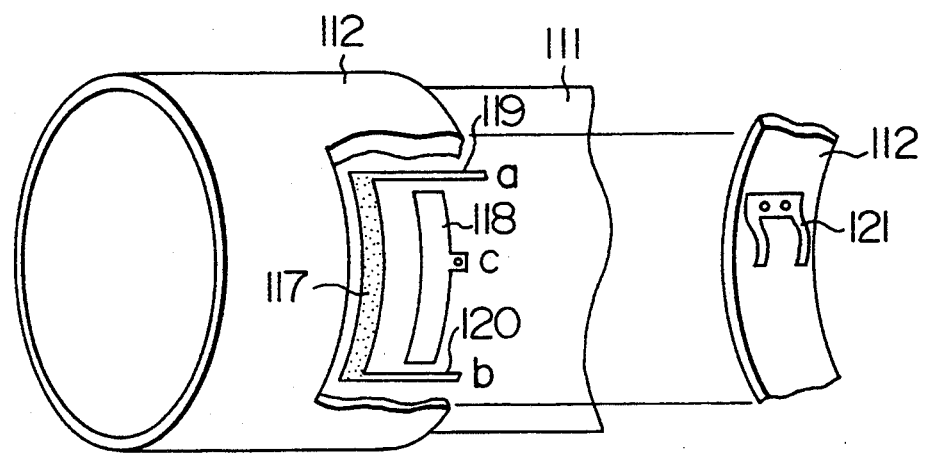
FIGS. 22 to 24 are partially-cut perspective views showing different examples of the construction of a manipulator used in the present invention.

FIG. 22 shows an example of the structure of the variable resistor 5 in FIG. 4. A resistor element 17 and conductors 118, 119 and 200 are formed on a surface of a lens barrel 111. Opposite ends of the resistor element 117 are connected to the conductors 19 and 120, respectively. A slider 121 is provided on the inner surface of a focus adjustment ring 112 and two contacts of the slider 121 are moved with the rotational movement of the focus adjustment ring 112 while contacting the resistor element 117 and the conductor 118, respectively. Therefore, when a voltage is applied between terminals a and b, a voltage corresponding to the contact position of the slider 121 can be detected from a terminal c. A control signal is outputted from the differential voltage detecting circuit 6 (see FIG. 4) on the basis of the detected voltage.

Figure 23:
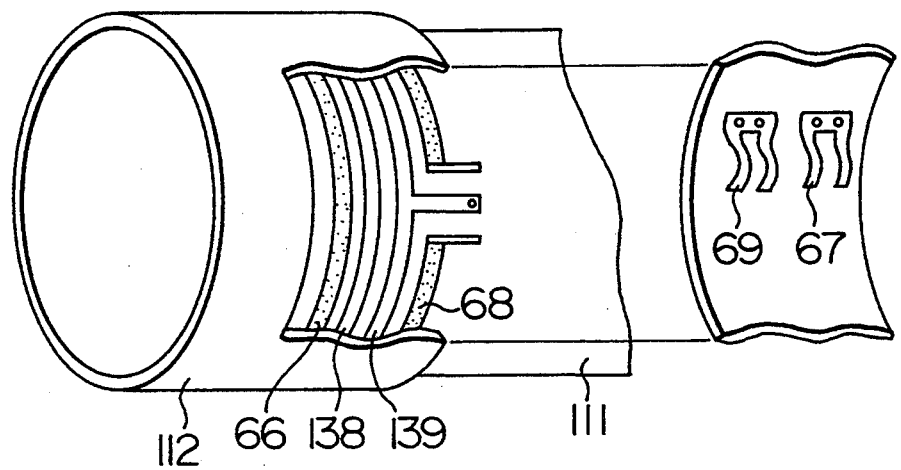

FIG. 23 shows an example of the structure of the variable resistor shown in FIG. 13. Resistor elements 66 and 68 and conductors 138 and 139 are formed on a surface of a lens barrel 111. A slider 67 contacting the resistor element 66 and the conductor 138 and a slider 69 contacting the resistor element 68 and the conductor 139 are provided on the inner surface of a focus adjustment ring 112. The principle of operation of this variable resistor is the same as that explained in conjunction with FIG. 13.

Figure 24:
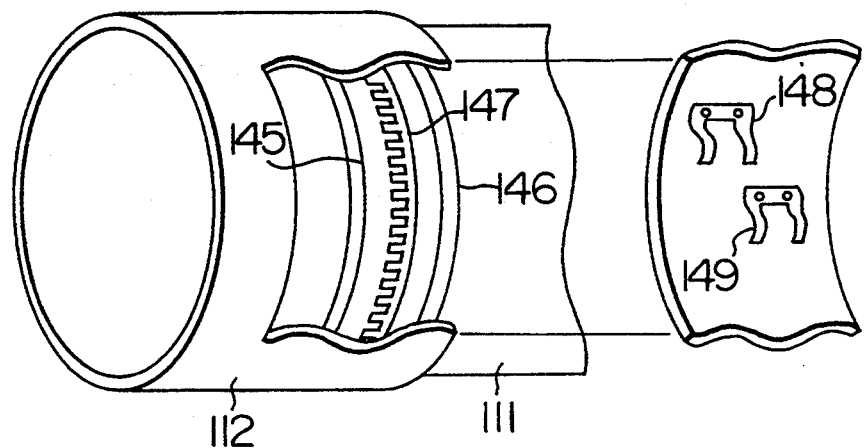

FIG. 24 shows an example of the rotary encoder 33 shown in FIG. 10. Conductors 145, 146 and 147 are formed on a surface of a lens barrel 111. On the inner surface of a focus adjustment ring 112 are provided a slider 148 which contacts the conductor 145 and a rectangularly zigzagged portion of the conductor 147 and a slider 149 which contacts the conductor 146 and the rectangularly zigzagged portion of the conductor 147. The principle of operation of this rotary encoder is the same as that explained in conjunction with FIGS. 11A and 11B.

Figure 25:
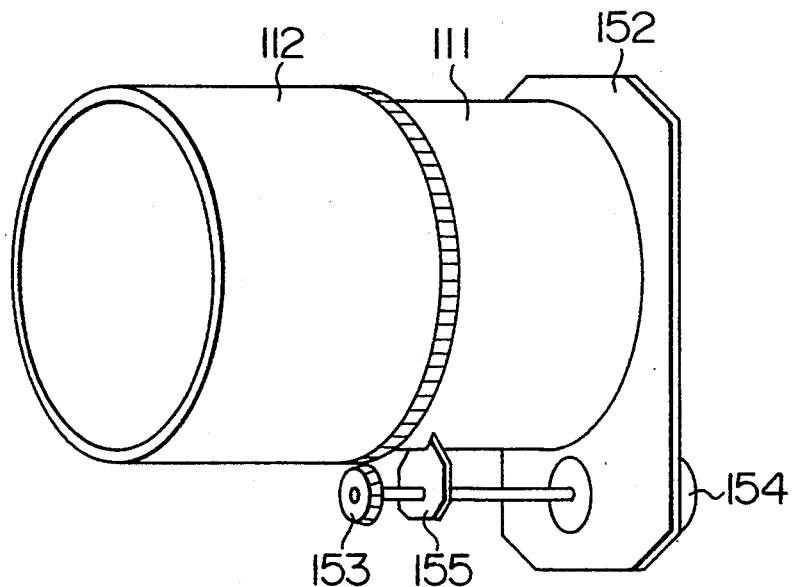
FIGS. 25 and 26 are perspective views schematically showing further constructive examples of the manipulator used in the present invention.
Figure 26:
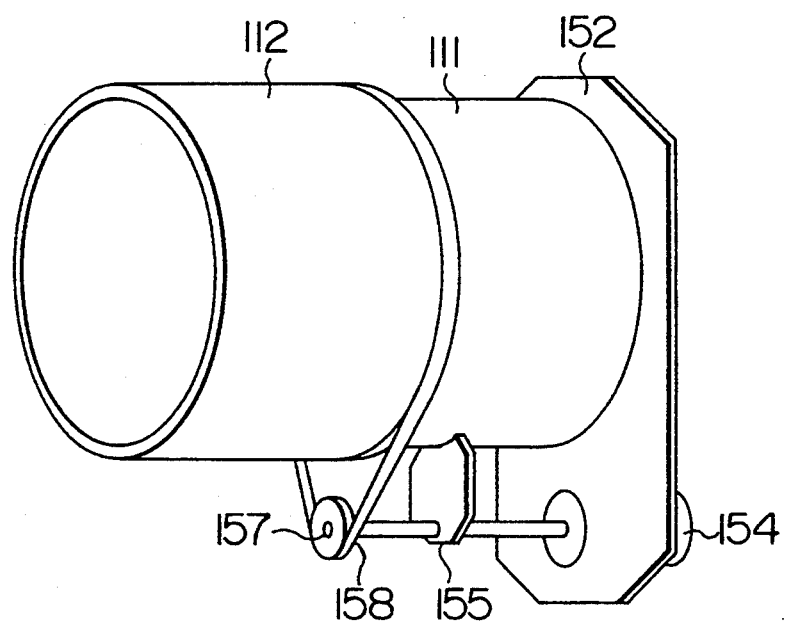

FIG. 25 shows a constructive example of a manual focus adjustment means using a gear. In FIG. 25, reference numeral 152 designates a supporting plate, numeral 153 a gear, numeral 154 a variable resistor, and numeral 155 a shaft supporting plate. A part of a focus adjustment ring 112 is provided with a gear configuration so that the rotational movement of the focus adjustment ring 112 is transferred to the gear 153, thereby changing an output of the variable resistor 154. FIG. 26 shows a constructive example of a manual focus adjustment means using a belt. The rotational movement of a focus adjustment ring 112 is transferred to a variable resistor 154 through a belt 158 and a belt wheel 157. A rotary encoder may be used in place of the variable resistor 54.

The rotation angle of a manipulator for manual focus adjustment (or the focus adjustment ring 112) is preferably about 90° in order to allow focus adjustment for an object from a near extreme to the extreme of ∞ with no need of re-gripping the manipulator and in order to prevent any deterioration of workability for fine adjustment.

According to the present invention, it is possible to move a focusing lens not in accordance with the rotation position of a manipulator for manual focus adjustment but in accordance with the direction and amount of rotation of the manipulator, and it is possible to move the focusing lens from one extreme of its movement range to another extreme thereof even for a small rotation angle of the manipulator. As a result, there is provided an effect that focus adjustment by power focusing can be made for any desired object properly, smoothly and with high precision and a design of a compact article can be realized without any inconvenience.

We claim:

1. A focusing apparatus comprising:
an optical system for converting an image of an object into an electric signal;
a manipulator which is manually operable for moving at least one optical element in said optical system in an optical axis direction of said at least one optical element for focus adjustment;
detecting means for detecting the amount and the direction of manipulation of said manipulator within an interval of time; and
moving means for moving said at least one optical element in a direction corresponding to the direction of manipulation of said manipulator detected by said detecting means and by a distance corresponding to the amount of manipulation of said manipulator detected by said detecting means;
wherein said manipulator includes a variable resistor which has a resistor element and a slider and said detecting means includes memory means for sampling and storing a voltage derived from said slider of said variable resistor within said predetermined interval of time, subtracter means for producing a differential voltage representative of a difference between the last sampled voltage and the preceding sample voltage, and means for determining the amount and the direction of manipulation of said manipulator based on results of a calculation performed by said subtracter means.

2. A focusing apparatus comprising:
an optical system for converting an image of an object into an electric signal;
a manipulator which is manually operable for moving at least one optical element in said optical system in an optical axis direction of said at least one optical element for focus adjustment;
detecting means for detecting the amount and the direction of manipulation of said manipulator within an interval of time; and
moving means for moving said at least one Optical element in a direction corresponding to the direction of manipulation of said manipulator detected by said detecting means and by a distance corresponding to the amount of manipulation of said manipulator detected by said detecting means;
wherein said manipulator includes a rotary encoder and said detecting means includes means for counting pulses from said rotary encoder during said predetermined interval of time to determine the amount of manipulation, and means for detecting two pulse signals from said rotary encoder different in phase from each other to determine the direction of manipulation based on the basis of a phase relation of the two pulse signals.

3. A video camera comprising:
a lens system for focusing an image of an object;

an image pickup element for converting the image into an electric signal;

a rotary manipulator which is manually operable and located on a circumference of an axis of the lens system, for generating an electric signal indicating manipulation movement thereof;

a motor for moving at least one lens of the lens system;

a motor driving circuit for driving the motor; and electric circuits for controlling the motor driving circuit in accordance with the electric signal generated by the rotary manipulator;

wherein said rotary manipulator is constructed so that it can be endlessly operated.

4. A focusing apparatus comprising:

an optical system for converting an image of an object into an electric signal;

a manipulator which is manually operable for moving at least one optical element in said optical system in an optical axis direction of said at least one optical element for focus adjustment;

detecting means for detecting the amount and the direction of manipulation of said manipulator within an interval of time; and moving means for moving said at least one optical element in a direction corresponding to the direction of manipulation of said manipulator detected by said detecting means and by a distance corresponding to the amount of manipulation of said manipulation detected by said detecting means;

wherein said manipulator is constructed so that it can be endlessly operated and wherein said manipulator includes a rotary encoder.

5. A focusing apparatus according to claim 4, wherein said detecting means includes counting means for counting output pulses from said rotary encoder within said interval of time, and means for detecting the phase of the output pulses from said rotary encoder to decode the direction of rotation of said rotary encoder.

6. A focusing apparatus comprising:

an optical system for converting an image of an object into an electric signal;

a manipulator which is manually operable for moving at least one optical element in said optical system in an optical axis direction of said at least one optical element for focus adjustment;

detecting means for detecting the amount and the direction of manipulation of said manipulator within an interval of time; and moving means for moving said at least one optical element in a direction corresponding to the direction of manipulation of said manipulator detected by said detecting means and by a distance corresponding to the amount of manipulation of said manipulation detected by said detecting means;

wherein said manipulator is constructed so that it can be endlessly operated.

7. A focusing apparatus according to claim 6, wherein said manipulator is rotatably provided on an outer periphery of a lens tube of said optical system, and said detecting means includes rotational movement detecting means for detecting the direction and amount of rotational movement of said manipulation relative to said lens tube.

8. A focusing apparatus according to claim 7, wherein said rotational movement detecting means includes a resistor element and a conductor which are provided on said lens tube along the direction of manipulation of said manipulator and a slider which is provided in said manipulator and contacts said resistor element and said conductor thereacross.

9. A focusing apparatus according to claim 7, wherein said rotational movement detecting means includes an alternate array of insulating portions and interconnected conductor portions which are alternately arranged on said lens tube along the direction of manipulation of said manipulator, a conductor which is provided parallel to said alternate array on said lens tube, and a slider which is provided in said manipulator and contacts said alternate array and said conductor thereacross.

10. A focusing apparatus according to claim 7, wherein said rotational movement detecting means comprises detecting means coupled with said manipulator in an interlocking relation therewith.

11. A focusing apparatus according to claim 6,
wherein said manipulator includes an endless variable resistor.

12. A focusing apparatus according to claim 11, wherein said endless variable resistor includes a resistor element which is configured into a circular arc shape and has opposite ends applied therebetween with a predetermined voltage and first and second sliders which are rotatable with a predetermined angle kept therebetween while contacting said resistor element and deliver output voltages having resistance value change characteristics different in phase from each other by a predetermined angle, and wherein said detecting means includes open area detecting means for detecting whether or not any one of said first and second sliders is present in an open area where the one slider does not contact said resistor element, and means for determining the amount and the direction of manipulation of said manipulator based on the output voltage from the other of said first and second sliders when said open area detecting means detects the presence of said one slider in the open area.

13. A focusing apparatus according to claim 12, wherein said resistor element includes a plurality of concyclic resistor element parts each of which is configured into a circular arc shape and has opposite ends applied therebetween with said predetermined voltage.

14. A focusing apparatus according to claim 11, wherein said endless variable resistor includes first and second resistor elements each of which is configured into a circular arc shape and has opposite ends applied therebetween with a predetermined voltage, and first and second sliders which are rotatable and interlocking with each other while contacting said first and second resistor elements respectively and deliver output voltages having resistance value change characteristics different in phase from each other by a predetermined angle, and wherein said detecting means includes open area detecting means for detecting whether or not any one of said first and second sliders is present in an open area where the one slider does not contact a corresponding one of said first and second resistor elements, and means for determining the amount and the direction of manipulation of said manipulator based on the output voltage from the other of said first and second sliders when said open area detecting means detects the presence of said one slider in the open area.

15. A focusing apparatus according to claim 14, wherein said first resistor element includes a plurality of concyclic resistor element parts each of which is configured into a circular arc shape and has opposite ends applied therebetween with said predetermined voltage, and said second resistor element includes a plurality of concyclic resistor element parts each of which is configured into a circular arc shape and has opposite ends applied therebetween with said predetermined voltage.

16. A focusing apparatus according to claim 14, further comprising means for converting an output voltage from any one of said first and second sliders present in the open area into a value substantially equal to an electric potential of one end of one of said first and second resistor elements.

17. A focusing apparatus according to claim 16, wherein said open area detecting means includes means for detecting whether or not any one of said first and second sliders is substantially equal to the electric potential of the one end of one of said first and second resistor elements.

18. A focusing apparatus according to claim 11, wherein said endless variable resistor includes a resistor element which is configured into a circular shape and has opposite ends applied therebetween with a predetermined voltage and a slider which contacts said resistor element.

19. A focusing apparatus according to claim 18, wherein said detecting means detects the amount and the direction of manipulation based on a detection voltage detected from said slider.

20. A focusing apparatus according to claim 19, wherein said detecting means includes differential voltage producing means for producing a differential voltage representative of a difference between two successive detection voltages detected within said interval of time.

21. A focusing apparatus according to claim 20, wherein said detecting means detects the direction of manipulation of said manipulator based on the plus/minus sign of a value of the differential voltage produced by said differential voltage producing means and detects the amount of manipulation of said manipulator based on the absolute value of the differential voltage.

22. A focusing apparatus according to claim 20, wherein said detecting means includes discontinuous voltage detecting means for detecting whether or not the absolute value of the differential voltage produced by said differential voltage producing means is larger than a predetermined value, and means for determining the direction and the amount of manipulation of said manipulator based on the maximum value and minimum value of the detection voltage and the differential voltage.

23. A focusing apparatus according to claim 19, wherein said detecting means includes discontinuous voltage detecting means for detecting a discontinuous change in the detection voltage detected from said slider, and modifying means for modifying the detection voltage upon detection of the discontinuous change by said discontinuous voltage detecting means into the quantity of voltage change resembling a voltage change when the detection voltage otherwise changes continuously.

24. A focusing apparatus according to claim 23, wherein said discontinuous voltage detecting means comprises means for detecting whether or not the absolute value of a voltage representative of a difference between two successive detection voltages detected within said interval of time is larger than a predetermined value.

25. A focusing apparatus according to claim 23, wherein said modifying means includes means for operatively determining a modified voltage based on a differential voltage representative of a difference between two successive detection voltages detected within said interval of time and a voltage representative of a difference between the maximum value and minimum value of the detection voltage.

26. A focusing apparatus according to claim 24, wherein said interval of time is set so as to provide a quantity of voltage change smaller than one half of a difference between the maximum value and minimum value of the detection voltage and said predetermined value is set to be one half of the difference between the maximum value and minimum value of the detection voltage.

* * * * *